United States Patent
Beltramini et al.

(10) Patent No.: US 10,252,910 B2
(45) Date of Patent: Apr. 9, 2019

(54) AUTO THERMAL REFORMING (ATR) CATALYTIC STRUCTURES

(71) Applicants: Saudi Arabian Oil Company, Dhahran (SA); The University of Queensland, St. Lucia (AU)

(72) Inventors: Jorge N. Beltramini, Queensland (AU); Moses O. Adebajo, Queensland (AU); Joao Carlos Diniz Da Costa, Queensland (AU); Gao Qing Lu, Queensland (AU); Thang V. Pham, Dhahran (SA); Sai P. Katikaneni, Dhahran (SA)

(73) Assignees: Saudi Arabian Oil Company, Dhahran (SA); The University of Queensland, St. Lucia (AU)

( * ) Notice: Subject to any disclaimer, the term of this patent is extended or adjusted under 35 U.S.C. 154(b) by 36 days.

(21) Appl. No.: 15/089,073

(22) Filed: Apr. 1, 2016

(65) Prior Publication Data
US 2016/0214090 A1    Jul. 28, 2016

Related U.S. Application Data

(62) Division of application No. 13/083,899, filed on Apr. 11, 2011, now Pat. No. 9,745,191.

(51) Int. Cl.
*C01B 3/48* (2006.01)
*B01J 37/04* (2006.01)
(Continued)

(52) U.S. Cl.
CPC .............. *C01B 3/48* (2013.01); *B01J 8/0411* (2013.01); *B01J 23/007* (2013.01); *B01J 23/464* (2013.01);
(Continued)

(58) Field of Classification Search
CPC ....................................................... C01B 3/48
See application file for complete search history.

(56) References Cited

U.S. PATENT DOCUMENTS 4,968,426 A    11/1990  Hay
5,160,352 A    11/1992  Najjar et al.
(Continued)

FOREIGN PATENT DOCUMENTS

CN    1438072 A        8/2003
CN    101875012 A     11/2010
(Continued)

OTHER PUBLICATIONS

Melo et al (Synthesis, characterization and catalytic behavior of NiMgAl mixed oxides as catalysts for hydrogen production by naptha steam reforming, Cata Today 133-135 (2008), pp. 383-393).*

(Continued)

*Primary Examiner* — Melvin C. Mayes
*Assistant Examiner* — Michael Forrest
(74) *Attorney, Agent, or Firm* — Bracewell LLP; Constance G. Rhebergen; Brian H. Tompkins

(57) ABSTRACT

An autothermal reforming catalytic structure for generating hydrogen gas from liquid hydrocarbons, steam and an oxygen source. The autothermal reforming catalytic structure includes a support structure and nanosized mixed metal oxide particles dispersed homogenously throughout the support structure.

8 Claims, 27 Drawing Sheets

(51) Int. Cl.

| | | |
|---|---|---|
| *B01J 37/08* | (2006.01) | |
| *B01J 37/00* | (2006.01) | |
| *B01J 37/18* | (2006.01) | |
| *B01J 35/04* | (2006.01) | |
| *B01J 37/02* | (2006.01) | |
| *B01J 35/00* | (2006.01) | |
| *B01J 27/236* | (2006.01) | |
| *B01J 23/89* | (2006.01) | |
| *B01J 23/78* | (2006.01) | |
| *B01J 23/75* | (2006.01) | |
| *B01J 23/46* | (2006.01) | |
| *B01J 23/00* | (2006.01) | |
| *B01J 37/03* | (2006.01) | |
| *B01J 35/06* | (2006.01) | |
| *B01J 23/755* | (2006.01) | |
| *B01J 8/04* | (2006.01) | |
| *C01B 3/40* | (2006.01) | |
| *C01B 3/50* | (2006.01) | |
| *B01J 37/06* | (2006.01) | |

(52) U.S. Cl.
CPC ............ *B01J 23/75* (2013.01); *B01J 23/755* (2013.01); *B01J 23/78* (2013.01); *B01J 23/8913* (2013.01); *B01J 27/236* (2013.01); *B01J 35/002* (2013.01); *B01J 35/006* (2013.01); *B01J 35/0006* (2013.01); *B01J 35/0053* (2013.01); *B01J 35/04* (2013.01); *B01J 35/065* (2013.01); *B01J 37/009* (2013.01); *B01J 37/0201* (2013.01); *B01J 37/0215* (2013.01); *B01J 37/0236* (2013.01); *B01J 37/0244* (2013.01); *B01J 37/031* (2013.01); *B01J 37/036* (2013.01); *B01J 37/04* (2013.01); *B01J 37/06* (2013.01); *B01J 37/08* (2013.01); *B01J 37/082* (2013.01); *B01J 37/18* (2013.01); *C01B 3/40* (2013.01); *C01B 3/503* (2013.01); *B01J 2523/00* (2013.01); *C01B 2203/0244* (2013.01); *C01B 2203/0283* (2013.01); *C01B 2203/041* (2013.01); *C01B 2203/107* (2013.01); *C01B 2203/1047* (2013.01); *C01B 2203/1058* (2013.01); *C01B 2203/1064* (2013.01); *C01B 2203/1076* (2013.01); *C01B 2203/1235* (2013.01); *C01B 2203/142* (2013.01); *Y02P 20/52* (2015.11)

(56) References Cited

U.S. PATENT DOCUMENTS

| | | | |
|---|---|---|---|
| 5,202,517 A | 4/1993 | Minet et al. | |
| 5,326,550 A | 7/1994 | Adris et al. | |
| 5,637,259 A | 6/1997 | Galuszka et al. | |
| 5,736,484 A | 4/1998 | Polanek et al. | |
| 5,767,040 A | 6/1998 | Bhattacharyya et al. | |
| 5,827,569 A | 10/1998 | Akiyama et al. | |
| 6,123,913 A | 9/2000 | Clawson et al. | |
| 6,207,132 B1 | 3/2001 | Lin et al. | |
| 6,331,283 B1 | 12/2001 | Roy et al. | |
| 6,653,005 B1 | 11/2003 | Muradov | |
| 6,854,602 B2 | 2/2005 | Oyama et al. | |
| 6,958,309 B2 | 10/2005 | Wang et al. | |
| 7,150,866 B2 * | 12/2006 | Wieland ............ | B01J 23/40 422/211 |
| 7,361,619 B2 | 4/2008 | Makek et al. | |
| 8,883,118 B2 | 11/2014 | Takahashi et al. | |
| 2003/0005633 A1 | 1/2003 | Bhattacharyya et al. | |
| 2005/0028671 A1 | 2/2005 | Krueger | |
| 2005/0036940 A1 | 2/2005 | Grace et al. | |
| 2005/0109609 A1 | 5/2005 | Rei et al. | |
| 2005/0158236 A1 | 7/2005 | Rei | |
| 2005/0276746 A1 | 12/2005 | Zhang et al. | |
| 2006/0013759 A1 | 1/2006 | Jiang et al. | |
| 2007/0021299 A1 | 1/2007 | Takehira et al. | |
| 2007/0036713 A1 | 2/2007 | Kobayashi et al. | |
| 2007/0131609 A1 | 6/2007 | Ramaswamy et al. | |
| 2007/0191651 A1 | 8/2007 | Coupard et al. | |
| 2007/0251388 A1 | 11/2007 | Oyama et al. | |
| 2008/0019902 A1 | 1/2008 | Rei et al. | |
| 2008/0031800 A1 | 2/2008 | Franz et al. | |
| 2008/0107593 A1 | 5/2008 | Nakamura et al. | |
| 2009/0090241 A1 | 4/2009 | Julbe et al. | |
| 2009/0314993 A1 | 12/2009 | Zhang et al. | |
| 2012/0015266 A1 | 1/2012 | Melo Faus et al. | |

FOREIGN PATENT DOCUMENTS

| | | |
|---|---|---|
| DE | 19804286 A1 | 8/1999 |
| EP | 189221 A1 | 7/1986 |
| EP | 1024111 A1 | 8/2000 |
| EP | 1132453 A1 | 9/2001 |
| EP | 1285692 A1 | 2/2003 |
| EP | 1547673 A1 | 6/2005 |
| EP | 1829821 A1 | 5/2007 |
| EP | 2251080 A1 | 11/2010 |
| EP | 2476484 A1 | 7/2012 |
| JP | 62158896 A | 7/1987 |
| JP | 2001043882 | 2/2001 |
| JP | 2011157834 A | 6/2001 |
| JP | 2005162586 A | 6/2005 |
| JP | 2005224722 | 8/2005 |
| JP | 2005281024 A | 10/2005 |
| JP | 2006052120 A | 2/2006 |
| JP | 2006272099 | 10/2006 |
| JP | 2007246333 A | 9/2007 |
| JP | 2008044812 A | 2/2008 |
| JP | 2008050211 A | 3/2008 |
| KR | 2006007574 A | 1/2006 |
| KR | 816879 B1 | 3/2008 |
| WO | 09925649 A1 | 5/1999 |
| WO | 199925649 A1 | 5/1999 |
| WO | 09943610 A1 | 9/1999 |
| WO | 2002092500 A1 | 11/2002 |
| WO | 2002102710 A1 | 12/2002 |
| WO | 2003076062 A2 | 9/2003 |
| WO | 2005058795 A1 | 6/2005 |
| WO | 2005077818 A1 | 8/2005 |
| WO | 2007031713 A1 | 3/2007 |
| WO | 2007092844 A2 | 8/2007 |
| WO | 2007111278 A1 | 10/2007 |
| WO | 2012067505 A2 | 5/2012 |

OTHER PUBLICATIONS

Yoshino et al (Development of tubular substrates, silica based membranes and membrane modules for hydrogen separation at high temperature, J Memb Sci 267 (2005) pp. 8-17).*

Tsuru et al (Membrane reactor performance of steam reforming of methane using hydrogen-permselective catalytic SiO2 membranes, J Mem Sci 316 (2008) 53-62). (Year: 2008).*

Oh, et al. "The Effect of Synthesis Conditions on Tailoring the Size of Hydrotalcite Particles, Solid State Ionics" (2002) 151, pp. 285-291.

PCT International Search Report and Written Opinion dated Aug. 7, 2012 for International Application No. PCT/US2012/032837, International Filing Date: Apr. 10, 2012.

Damle, Ashok S., "Hydrogen production by reforming of liquid hydrocarbons in a membrane reactor for portable power generation—Experimental studies" Journal of Power Sources 186 (2009); pp. 167-177.

Kanezashi, Masakoto et al.; "Hydrogen permeation characteristics and stability of Ni-doped silica membranes in steam at high temperature" Journal of Membrane Science 271 (2006); pp. 86-93.

(56) References Cited

OTHER PUBLICATIONS

Takehira, Katsuomi et al.; "Autothermal reforming of CH4 over supported Ni catalysts prepared from Mg-Al hydrotalcite-like anionic clay" Journal of Cataysis 221 (2004); pp. 43-54.

* cited by examiner

PXRD

PXRD (homemade samples and Com. Sample)

PXRD

Figure 1: Catalyst FCR-71D
Test using CMR at 500 C with gasoline (same conditions as fixed bed reactor)

CMR -1: Retentate Product Distribution

CMR -2: Permeate Product Distribution

CMR -2: Retentate Product Distribution

CMR -3: Retentate Product Distribution

CMR-1: Hydrogen Production Purity

AUTO THERMAL REFORMING (ATR) CATALYTIC STRUCTURES

CROSS-REFERENCE TO RELATED PATENT APPLICATIONS

This application is a divisional of and claims priority to U.S. patent application Ser. No. 13/083,899 titled "AUTO THERMAL REFORMING (ATR) CATALYTIC STRUCTURES" and filed on Apr. 11, 2011 now U.S. Pat. No. 9,745,191.

TECHNICAL FIELD OF THE INVENTION

The present invention relates to the formulation of autothermal reforming (ATR) catalytic structures that are useful for hydrogen generation from liquid fuel hydrocarbons.

BACKGROUND OF THE INVENTION

With stricter environmental regulations on transportation fuels, coupled with higher level of heavier crude oil processing, demand for hydrogen in refineries is expected to increase in order to meet the need for more hydrotreating and hydrocracking processes. Today, about 95% of hydrogen is supplied by large-scale steam reforming of natural gas, which employs reforming, water-gas-shift (WGS), and pressure adsorption processes in successive steps. Efficiency, however, suffers for smaller scale operations. Therefore, hydrogen production at a smaller scale from fossil fuels necessitates further development to meet the requirements of purity, economics and versatility for a variety of emerging applications such as the use of fuel cell powered vehicles.

During the last decade, there have been growing concerns about the shortage of energy supply in the world. Fuel cell technologies that use hydrogen may offer potentially non-polluting and efficient fuel for today's rising energy demands. While this type of technology is in development for renewable sources of hydrogen, hydrogen is typically commercially produced through conversion of hydrogen rich energy carriers.

Therefore, cost effective methods for the production of hydrogen from fossil fuels are becoming increasingly important, and more particularly, methods for the production of low cost, pure hydrogen, which is free from carbon monoxide are needed.

Hydrocarbon steam reforming (SR), partial oxidation (PDX) and autothermal reforming (ATR) are important known processes for hydrogen production. Steam reforming of high molecular weight hydrocarbons has been practiced for over 40 years in locations where natural gas is not available. ATR of higher hydrocarbons, however, is preferable to SR because it combines a highly endothermic SR process with an exothermic PDX process. This means that ATR is a more thermally stable process than SR, and can be driven to thermo-neutral conditions. In addition, the start up of the ATR is more rapid than SR.

Sulfur deposition on many commercial catalysts tends to induce coke accumulation, and because commercial fuels contain sulfur that cannot be completely removed (due to the sulfur being present in the aromatic ring of the fuels), use of these types of commercial catalysts typically results in unwanted coking and early deactivation of the catalysts. Conversely, catalysts having noble metals, particularly Rh-based catalysts, can tolerate sulfur and prevent coke deposition, thereby making them more active in the reforming of hydrocarbons to synthesis gas. A significant drawback of noble metal based catalysts, however, is their significantly greater cost, as compared with non-noble metal based catalysts. For example, the price of rhodium has risen almost 10 fold over the past 3 years from an average of about USD $16.77 per gram in 2007 to about $149.71 per gram in 2010.

Steam reforming of methane is typically used as a form of catalytic reaction for the production of hydrogen. Conventional catalytic systems utilizing either nickel or noble metal catalysts for the steam reforming of methane require primary reaction temperatures of about 700° C. and above, followed by rather extensive and expensive purification processes to provide a hydrogen product with reasonable purity (i.e., greater than 95% by volume) that can be used as a feed stock for many common processes.

Reforming of hydrocarbons other than methane, notably oil products, can be achieved with reactions similar to steam reforming of natural gas. The successive breaking of the C—C terminal bonds of higher hydrocarbons (i.e., hydrocarbons having at least 2 carbon atoms present) with suitable catalysts is more difficult than for methane, however, due to differences in reaction rates and increased propensity for thermal cracking (also called pyrolysis). To avoid the issues related to differing reaction rates and thermal cracking, carbon stripping is usually done in a separate pre-reformer, making this option of producing hydrogen more complex and more expensive than natural gas reforming.

Hydrogen can also be produced from non-volatile hydrocarbons, such as heavy oils, by gasification or partial oxidation. Gasification processes utilize steam at temperatures above about 600° C. to produce hydrogen whilst carbon is oxidized to $CO_2$. Gasification, however, is usually not economical compared to steam reforming and partial oxidation processes. By comparison, partial oxidation is a considerably more rapid process than steam reforming. In partial oxidation, the hydrocarbon feed is partially combusted with oxygen in the presence of steam at a temperature of between about 1300° C. and 1500° C. Pressure has little effect on the reaction rate of the process and is usually performed at pressures of about 2 to 4 MPa to permit the use of more compact equipment and compression cost reduction. When air is used as the oxygen source, nitrogen must be removed from the resulting hydrogen gas product, typically requiring a separate stage following the oxidation reactor. Partial oxidation is thus more suitable for small scale conversion, such as in a motor vehicle that is equipped with fuel cells. The process can be stopped and started, as required for on-board reformation, and when in progress, it can provide elevated temperatures that may start steam reforming along with the oxidation processes. This is called autothermal reforming and involves all the reactions mentioned so far.

The water-gas-shift (WGS) reaction is an alternative hydrogen production technology frequently used following a primary catalytic reaction utilized to remove carbon monoxide impurities and increase overall hydrogen yield. The WGS reaction is mildly exothermic and thus is thermodynamically favored at lower temperatures. The kinetics of the reaction, however, are superior at higher temperatures. Therefore, it is common practice to first cool the reformate product from the reformer in a heat exchanger to a temperature between about 350° C. and 500° C., and then conduct the reaction over a suitable WGS catalyst. The resulting reformate is then cooled once again to a temperature between about 200° C. and 250° C., and reacted on a low temperature designated WGS catalyst. Due to these several conversion and heat exchanging steps involved, however, the process is economically expensive and highly inefficient.

Pressure Swing Adsorption (PSA) is a well-known established method to separate hydrogen from a stream containing impurities. PSA employs multiple beds, usually two or more, of solid adsorbents to separate the impure hydrogen stream into a very pure (99.9%) hydrogen product stream and a tail gas stream that includes the impurities and a fraction of the hydrogen produced. As an example, synthesis gas ($H_2$ and CO) may be introduced into one bed where the impurities, rather than the hydrogen, are adsorbed onto the adsorbents. Ideally, just before complete loading is achieved, this adsorbent bed is switched offline and a second adsorbent bed is placed on line. The pressure on the loaded bed is subsequently reduced, which liberates the adsorbed impurities (in this case predominantly $CO_2$) at low pressure. A percentage of the inlet hydrogen, typically approximately 15 percent, is lost in the tail gas. A significant disadvantage of the PSA is that low tail gas pressure essentially limits the system to a single WGS stage. Limiting a hydrogen separation system to a single WGS stage thus decreases the amount of CO conversion as well as the total amount of hydrogen recovery. PSA is also undesirable, as compared to the use of membranes, in part due to the mechanical complexity of the PSA, which leads to higher capital and operating expenditures and potentially increased downtime.

Hydrogen is produced and removed through hydrogen permeable metal membranes, such as palladium or palladium alloys. Metallic membranes, particularly palladium or palladium alloys, however, are very expensive, sensitive to sulfur compounds, and difficult to co-sinter with or sinter onto a catalyst layer. Additionally, such devices produce hydrogen using only the WGS reaction.

Another type of membrane is the so-called dense protonic ceramic membrane for hydrogen separation and purification. It is based on the use of single-phase and mixed-phase perovskite-type oxidic protonic ceramic membranes for separating or decomposing hydrogen containing gases or other compounds to yield a higher value product. However, these membranes suffer many of the shortcomings noted previously.

Thus, it is highly desirable to develop membrane reactors that are capable of converting liquid hydrocarbons into high purity hydrogen in a single step.

SUMMARY OF THE INVENTION

The present invention is directed to methods and catalytic structures that address or reduce the weaknesses of various known catalytic structures and which provide for a hydrogen source without carbon monoxide. Embodiments of the present invention include methods for the synthesis of catalytic mixed metal oxides obtained by means of thermal decomposition of layered double hydroxides ("LDHs") and the behavior of these materials on liquid hydrocarbon conversion into hydrogen using an autothermal reforming reaction.

In one embodiment, the invention provides a method for formulating an autothermal reforming (ATR) catalytic structure. The method can include the steps of obtaining a basic solution having a basic pH, obtaining an acidic solution having an acidic pH, mixing the basic solution with the acidic solution to create a sol-gel having layered double hydroxides (LDH) precursors through co-precipitation of the metal cations with the basic solution, heating the sol-gel at a decomposition temperature above 500° C. and below a sintering temperature that would result in catalyst sintering for a period of time such that the LDH precursors are at least partially decomposed to form a calcined material, and conducting a metal reducing step (i.e., the metal oxide is reduced to its elemental state) on the calcined material to collapse the layered crystal structures within the LDHs using a mixture of hydrogen on nitrogen at a temperature in the range of about 450° C. to about 700° C. to form the ATR catalytic structure. In one embodiment, the porosity of the ATR catalytic structure is about 65-70%. In one embodiment, the basic solution includes an alkaline metal hydroxide, an alkaline metal carbonate, and water. In another embodiment, the acidic solution includes salts and water, wherein the salts are comprised of cations and anions, wherein the cations are comprised of magnesium, nickel, and aluminum. In one embodiment, the ATR catalytic structure has nanosized mixed oxide particles dispersed throughout, wherein the nanosized mixed metal oxides have diameters in the range of 40-300 nm. In one embodiment, the LDHs have layered crystal structures. In one embodiment, the ATR catalytic structure can be suspended in a sol-gel and added to a tubular support having a porous structure, such that the resulting apparatus is operable to convert liquid hydrocarbons into hydrogen via an autothermal reforming reaction.

In one embodiment, the nanosized mixed metal oxides have a surface area between 100 to 300 $m^2/g$. In one embodiment, the nanosized mixed metal oxides are homogeneously distributed throughout the ATR catalytic structure. In another embodiment, the nanosized mixed metal oxides are thermally stable.

In one embodiment, the basic solution has a pH value between 10 and 12. The basic solution can include a mixture of NaOH with $Na_2CO_3$, such that the basic solution has a pH value of about 12. In another embodiment, the metal cations have an absence of precious metals. Exemplary, non-limiting, precious metals include platinum, rhodium, gold, iridium, osmium, palladium, rhenium, ruthenium, and platinum. In one embodiment, the acidic solution has a total cationic concentration of approximately 1.5 M. In another embodiment, the metal cations can have an aluminum concentration of about 20 to 35 mol %.

In one embodiment, the step of conducting a metal reducing step on the LDHs is conducted at a temperature within a range from about 450° C. to 700° C. In one embodiment, the decomposition temperature is within a range from about 500° C. and 600° C. In one embodiment, the ATR catalytic structure is operable to produce a hydrogen product stream from a feed stream having liquid hydrocarbons through the use of an ATR reaction when incorporated into a porous tubular support.

In another embodiment, the invention provides for a method of formulating an autothermal reforming (ATR) catalyst according to the following steps:
a. preparing a basic solution having a pH at or above about 10, the basic solution including a hydroxide, preferably an alkaline metal hydroxide, sodium carbonate and water;
b. preparing an acidic solution having a pH below 7, wherein the acidic solution is prepared by combining a mixture of salts with water, wherein the salts are comprised of cations and anions, wherein the cations are comprised of magnesium, nickel, and aluminum, wherein the acidic solution has a total cationic concentration of about 1.5 M;
c. mixing the acidic solution and the basic solution together for a period of time operable to form a sol-gel;
d. aging the sol-gel for a predetermined period of time to form a formed solid;
e. washing and filtering the formed solid with water until a generally neutral pH is reached;

f. drying the formed solid for a predetermined period of time to form a dry solid;

g. calcining the dry solid at a predetermined temperature for a predetermined period of time to form a calcined material; and h. subjecting the calcined material to a metal reduction step by contacting the calcined material with a mixture of hydrogen and nitrogen gases at a temperature in the range of about 450° C. to about 700° C. to form the ATR catalytic structure, the ATR catalytic structure having nanosized mixed oxide particles dispersed throughout, wherein the nanosized mixed metal oxides have diameters in the range of about 40 to about 300 nm.

In another embodiment, the anion can include a nitrate. In another embodiment, the cations can further include an absence of precious metals. In one embodiment, the basic solution of step (a)can be prepared by combining a predetermined amount of NaOH with $Na_2CO_3$ such that the basic solution has a pH of about 12. In another embodiment, the ATR catalytic structure is operable to produce a hydrogen product stream from a feed stream having liquid hydrocarbons through the use of an ATR reaction when incorporated into a porous tubular support. In a further embodiment, the hydrogen product stream is substantially free from carbon monoxide.

In an additional embodiment, the invention provides for an autothermal reforming (ATR) catalytic structure useful for generating hydrogen gas from liquid hydrocarbons. In one embodiment, the ATR catalytic structure can include a support structure and nanosized mixed metal oxides dispersed homogenously throughout the support structure. The nanosized mixed metal oxides have metal cations that include aluminum, nickel, and magnesium, wherein the nanosized mixed metal oxides have a surface area of about 100 to 300 $m^2/g$, and the nanosized mixed metal oxides have diameters in the range of about 40-300 nm. In one embodiment, the acidic solution can have a total cationic concentration of about 1.5 M. In another embodiment, the metal oxides within the solution can have an aluminum concentration of about 20 mol % to 35 mol %. In another embodiment, the ATR catalytic structure is operable to produce a hydrogen product stream from a feed stream having liquid hydrocarbons through the use of an ATR reaction. In a further embodiment, the hydrogen product stream can be substantially free from carbon monoxide. In an additional embodiment, the ATR catalytic structure can further include an absence of noble metal ions.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
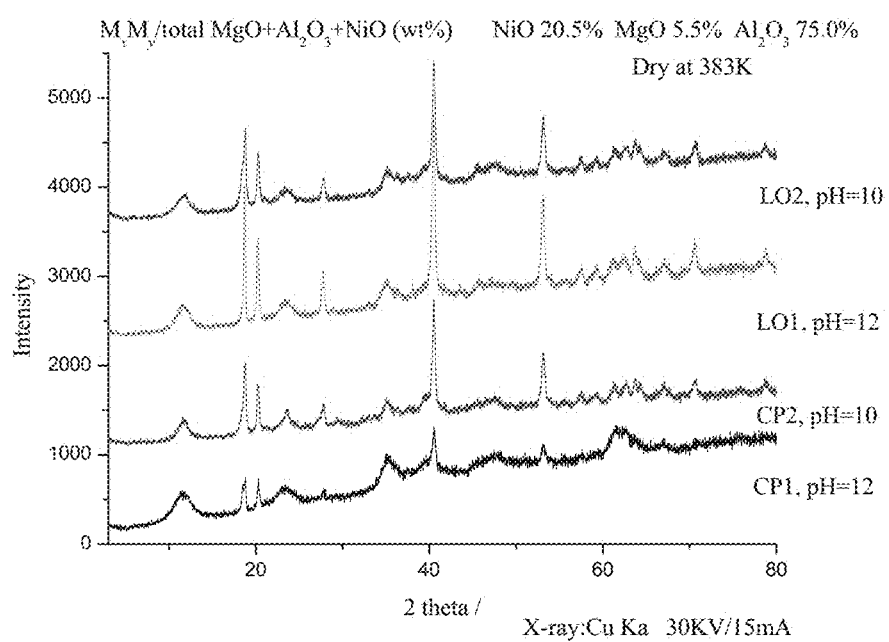
FIGS. 1-3 include graphical representations of experimental data collected in accordance with embodiments of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Nano sized catalysts provide advantages over their full size counterparts, particularly in autothermal and WGS reactions, in that they increase reaction activity, improve selectivity, improve reactivity towards hydrogen production, and minimize the undesirable methanation reaction.

Carbon formation (as coke), which is a primary disadvantage of a reforming process, is a kinetic issue. As such, coke production depends on the relative reaction rates of possible carbon species reaction alternatives. The reaction mechanism is largely dependent on the hydrocarbon type, operating conditions, and catalyst characteristics. For example, catalyst characteristics can influence the reaction mechanism by increasing water adsorption-dissociation rate on the catalyst and gasification rate with respect to the C—C scission.

Catalyst characteristics are generally determined by their physical-chemistry, composition, structural, and textural properties, such as: active area, metal particle size, metal dispersion, and reducibility. These properties depend on metal-support interaction, and they could be established on different stages of catalyst synthesis. For example, varying the material composition of a precursor, the preparation method and/or the heat treatments (calcination or reduction), can provide desired characteristics of the catalyst for optimum performance.

The present invention provides novel mixed metal oxides that are obtained by thermal decomposition of layered double hydroxides (LDHs) and offers the opportunity to control a catalyst's active site nature and its environment, as well as catalyst texture and stability. LDHs are a unique class of layered materials having positively charged layers and charge balancing anions located in the interlayer region. Typically, LDHs can be synthesized by the co-precipitation of metallic salts with a concentrated alkaline solution. An alternative method for the preparation of LDHs is through the sol gel method. Thermal treatments of the mixed metal oxides resulting from the LDHs prepared by the sol gel method can lead to materials that demonstrate synergetic effects between the elements in the mixed metal oxide structure, and after appropriate activation treatment, give rise to well dispersed metal particles like supported metal catalysts, with the possibility of controlling metal-support interaction during the synthesis stage.

In one embodiment of the present invention, a new catalytic structure that can be used for reforming reactions is provided. In one inventive method of preparing said catalytic structure, several different types of LDHs can be prepared using a sol-gel precipitation method. In one embodiment, two aqueous solutions are prepared; one acidic and one basic. In certain embodiments, the sol is base catalyzed. The acidic solution preferably contains one or metal salts, such as magnesium salts, and specifically nitrates and salts of the same for nickel and aluminum using a desired Al/(Ni+Mg+Al) ratio. The pH of the acidic solution is preferably within the range of about 4 to about 6. In one embodiment, the total cationic concentration of the metal salts in the acidic solution is about 1.5 M. The basic solution can be obtained by mixing suitable amounts of sodium hydroxide and sodium carbonate in order to maintain a ratio of carbonate ions to nickel, magnesium and aluminum ions of around 0.7 and a pH for synthesis of approximately 12.

After the solutions are prepared, they can then be added into a large mixing device and put into mechanical agitation for an appropriate period of time to form a sol-gel. In one embodiment, the appropriate amount of time is determined by measuring the concentration of metal oxide. In one embodiment, 95% concentration of metal oxide is acceptable. At concentrations at or above 95%, a preferred amount of reactant has been consumed, and agitation can be stopped. In one embodiment, ICP-AES analysis can be used to verify the metal oxide concentration. In one embodiment, this mixing step can be for up to about 5 hours. Following the mixing step, the obtained sol-gel is left to age at a temperature of between about 50 and 75° C., alternatively at a temperature of about 60° C. for an appropriate amount of time, which can be up to about 6 hours, alternatively up to about 10 hours, alternatively up to about 15 hours, or greater than 15 hours. During aging, at least a portion of liquid within the sol-gel evaporates. In one embodiment, rapid aging is not preferred as it can detrimentally impact gel characteristics. The resulting solid can then be filtered and washed with distillated water until the wash water has a neutral pH of about 7. Water washing is desirable to remove all undesired and converted reactants. Those of ordinary skill in the art will understand neutral pH to including a pH within the range of about 6.5 to 7.5. Next, the resulting washed solid LDH material can be dried at about 100° C. for an appropriate amount of time, which can be up to about 5 hours, alternatively up to about 10 hours, alternatively up to about 15 hours. In one embodiment, the LDH material can then be calcined in air at temperatures up to 550° C., alternatively at a temperature of between about 400° C. and 600° C., alternatively at a temperature between about 400° C. and 500° C., alternatively at a temperature between about 500° C. and 600° C., for a period of time, which can be up to about 5 hours, alternatively up to about 8 hours, alternatively up to about 12 hours. The resulting solid product is a catalyst precursor of a mixed metal oxide that includes Ni/Mg/Al. Supported metal catalysts suitable for autothermal reforming reaction of liquid hydrocarbons into hydrogen can be obtained from these precursors after a metal reducing step by contacting with a gas mixture that includes hydrogen and can also include nitrogen at a temperature of about 500° C., alternatively between about 400° C. and 550° C., for a period of time, which is up to about 5 hours. In one embodiment, the gas mixture contains about 5% molar hydrogen, alternatively between about 1 and 10% molar hydrogen, alternatively between about 5 and 10%, alternatively between about 5 and 15%, alternatively between about 10 and 20% molar hydrogen.

Figure 2:
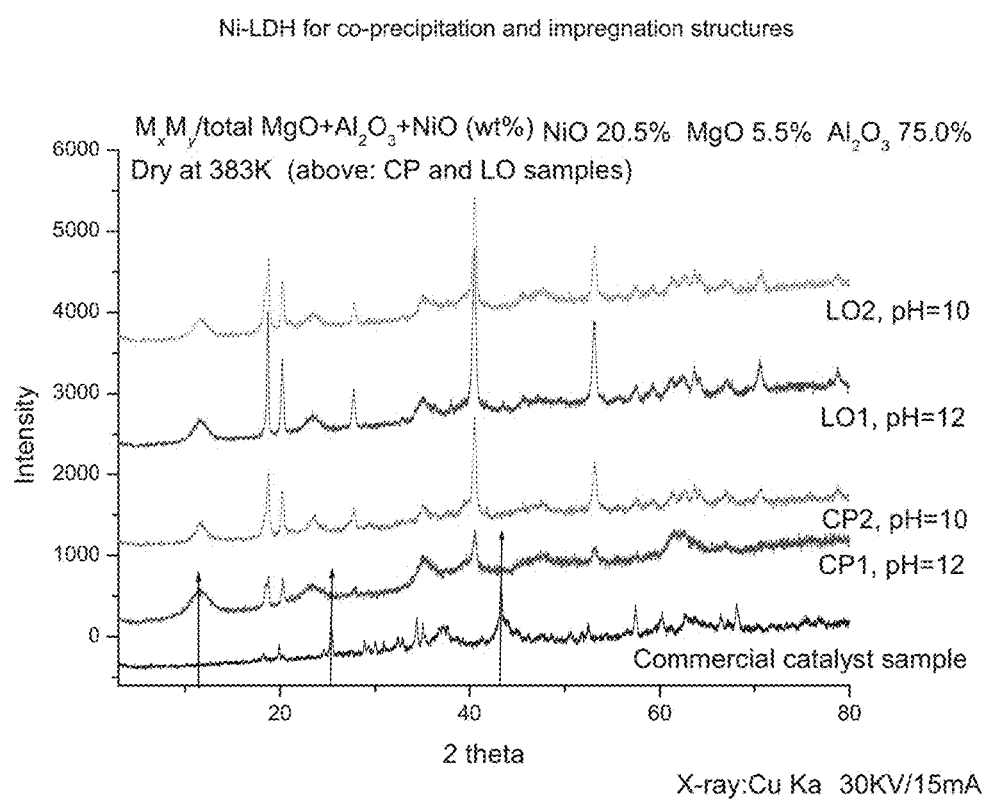
Figure 3:
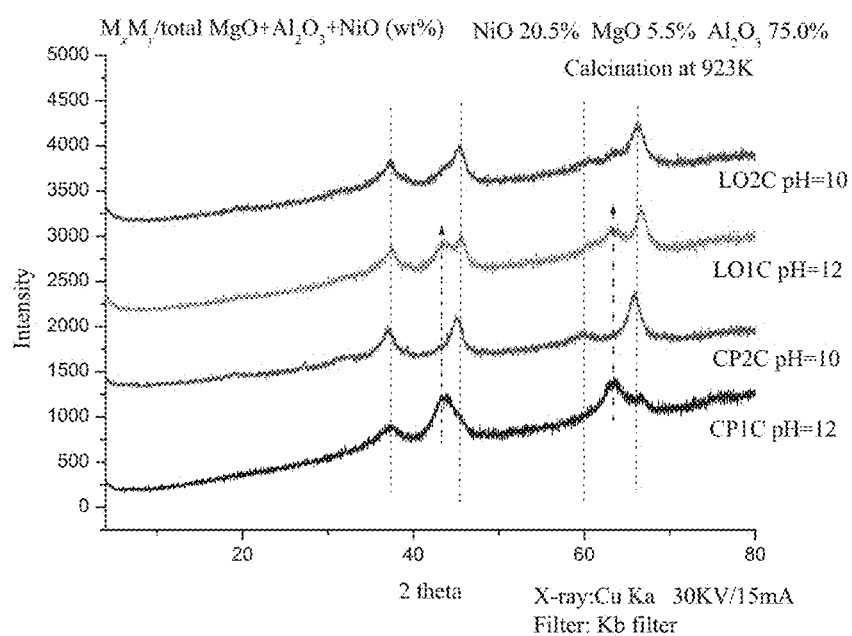

During the metal oxide reduction step, at temperatures greater than about 300° C., the LDL structure will collapse, and in the presence of hydrogen, the metal oxide can be reduced to its elemental state. The collapsed structure was confirmed using XRD (and is shown in FIGS. 1-3). In general, the collapsed structure has an increased density, relative to the starting material, and a porosity that is sufficient for diffusion of reactants into the catalyst to undergo the desired reactions. In certain embodiments, the porosity of the collapsed material can remain consistent with the starting material, having a porosity that is in the range of about 65-70%, which in turn can facilitate the desired reforming reactions.

Experimental Design for Catalytic Structure:

The following synthesis parameters were investigated to obtain catalyst structures in accordance with embodiments of the present invention:

Al/Mg mole ratio between 0.2-5 in the form of mixed metal oxides
Calcination temperature: 500° C.-600° C.
Reduction temperature: 500° C.
Concentration of Hydrogen: 5 to 20% by mole
Nickel incorporation method: Co-precipitation simultaneously with magnesium and aluminum or impregnation on Al—Mg support.

In order to study the synthesis parameter effects on catalytic characteristics of these materials, different series of samples were prepared. In each different sample, only one parameter was changed. The baseline material, identified as CP10C, had the following parameters:

| | |
|---|---|
| Nickel content: | 10 wt % |
| Cation ratio [Al/(Al + Mg + Ni)]: | 0.20 |
| Calcination temperature: | 550° C. |
| Reduction temperature: | 500° C. |
| Nickel incorporation method: | co-precipitation with magnesium and aluminum. |

To determine the Al/Mg ratio effect on catalytic behavior, several catalysts were prepared wherein the Al/Mg ratio was varied between 0.2 and about 5.

To determine the calcination temperature effect on catalytic behavior, several mixed oxides catalysts were prepared wherein the calcination temperatures were varied between about 400° C. and about 800° C.

To determine reduction temperature effect on catalytic behavior, several catalysts were prepared wherein the reduction temperatures was varied between about 450° C. and about 700° C.

To determine the effect of the nickel incorporation method on catalytic behavior, several catalysts were prepared by co-precipitation and by impregnation. Catalysts marked with "LO" were prepared by impregnation, and catalysts marked with a "CP" were prepared by co-precipitation.

The results and characteristics for each of the materials were measured using several different techniques in order to correlate catalytic activity with corresponding structural properties. Catalyst support surface area was measured using the BET technique employing nitrogen physisorption at the temperature of liquid nitrogen in a Quantachrome Autosorb-1C instrument. The percentage of metal loading was measured by Inductively-Coupled Plasma Atomic Emission Spectrometry (ICPAES). X-ray Diffraction (XRD) was carried out using Rigaku Miniflex diffractometer employing a Cu-Kα radiation source (30 KV/15 mA). The average particle size for different phases present on each state of the sample (calcined, reduced or used) was estimated by the Scherre equation, which is reproduced below:

$$\tau = \frac{K\lambda}{\beta\cos\vartheta}$$

where K is the shape factor, λ is the x-ray wavelength, β is the line broadening at half the maximum intensity (i.e., full width at half maximum) in radians, θ is the Bragg angle; and τ is the mean size of the ordered (crystalline) domains.

Nickel surface area can be measured using well established advanced analytical techniques, such as hydrogen chemisorptions complemented by temperature programmed reduction (TPR) where it is possible to estimate total metal surface area, size of metal particle and metal dispersion.

Temperature programmed reduction (TPR) was carried out using a 5% $H_2/N_2$ mixed gas flowed at 50 mL/min and used to study the reducibility of the calcined samples by means of hydrogen consumption. From TPR curves, the temperature at which a maximum curve appears (nickel reduction temperature) can be used to determine the most efficient reduction conditions. The degree of reduction can be estimated by comparing TPR curves corresponding to calcined and reduced samples. Coke formation on samples during activity test can be determined by analysis of the temperature-programmed oxidation (TPO). Autothermal reforming reaction study was carried out in a down low fixed-bed reactor catalytic system.

Approximately 1 gram of the catalyst was used having particles the size of about 30-50 mesh without dilution. The catalyst tested was pre-reduced in an $H_2$ gas stream (5%) at a temperature of about 500° C. for about 5 hours. Two thermocouples controlled the operation temperature, wherein a first thermocouple was positioned in the oven and the other thermocouple was positioned at the center of the catalyst bed. All reactants were introduced from the top of the reactor. Air was used as a source of oxygen. Two HPLC pumps fed water and hydrocarbon, which were mixed and evaporated before being introduced into the reaction region. The pressure of the reaction was maintained by a backpressure regulator connected with a precision gauge to read the pressures. Time zero was measured at the point when the reactor contents were heated to the chosen reaction temperature, which usually took about 45 minutes. Gas samples were removed through the gas sampling system throughout the length of the test once the reaction temperature was reached. Effluent from the reactor was cooled in a double pipe condenser to condense the condensable vapors. The gas and liquid samples were analyzed by gas chromatography.

The autothermal reforming reaction was investigated at different reaction conditions as follows:

| | |
|---|---|
| Hydrocarbon feed: | n-octane, |
| Reaction Temperature: | 500° C., 550° C. and 600° C. |
| Total Pressure: | 3 bars |
| Weight Hourly Space Velocity (WHSV): | 5000 h$^{-1}$ |
| Oxygen/Carbon (molar ratio): | 0.5 |
| Steam/Carbon (molar ratio): | 3 |

The general reaction procedure included packing the catalysts into the reactor, starting the reactor temperature controller and then, following catalyst reduction, setting the desired temperature condition. Approximately, fifteen minutes before the test began, steam was passed through the catalyst bed. Following this, the air flow meter with the water and hydrocarbon pumps were turned on all together at the established conditions.

Each experiment ran for approximately eight hours. The first two hours were conducted at temperature of about 500° C., and then increased to a temperature of about 600° C. for a further two hours, and again increased to a temperature of about 700° C. for two hours and finally returning to a temperature of about 500° C. for the final two hours. Every thirty minutes, a reformate gas sample was taken for analysis to determine the molar concentrations of $H_2$, $O_2$, $CH_4$, CO and $CO_2$. Volumetric flow (ml/min) and density (g/ml) of the liquid reformate products were also tested, and were passed through a Gas Chromatography-Flame Ionization Detector (GC-FID) assay.

Two Shimadzu GC-17A Gas Chromatography (GC) units were used to estimate the composition of the product gases and liquid reformate collected from the ATR reaction. The GC units were equipped with thermal conductivity (TCD) and flame ionization (FID) detectors. Specifically, the GC-TCD was used to evaluate the presence of $H_2$, $O_2$, $N_2$, $CH_4$, CO and $CO_2$ using a ⅛ inch 6 ft Carbosphere 80/100 packed column. The light and heavy liquid hydrocarbons were analyzed using a GC-FID coupled with a 100 m×0.25 mm ID BPI-PONA capillary column. Liquid product identification was also carried out in a Shimadzu GCMS-QP5050A mass spectrometer equipped with a DB-5 column.

For the GC-TCD method, the injector was held at 100° C. and detector temperature was 150° C. The oven temperature was initially maintained at a temperature of 40° C. for 5 minutes, and then increased to a temperature of 120° C. at a rate of 5° C./min. In the case of the GC-FID, the injector was held at 280° C. and detector temperature was 320° C. The oven temperature was initially maintained at a temperature of 60° C. for 5 minutes, and then increased to 280° C. at a rate of 10° C./min.

Referring to FIG. 1, x-ray diffraction spectra for 4 samples prior to calcination are provided. Samples LO1 and LO2 were prepared by impregnation, and samples CP1 and CP2 were prepared by co-precipitation. The samples had compositions of about 20.5% by weight NiO, 5.5% by weight MgO, and 75% by weight $Al_2O_3$. The samples were all air-dried at 110° C. for approximately 5 to 15 hours. As shown in the x-ray diffraction spectra stacked plot shown in FIG. 1, the individual spectra for each sample are relatively similar, thus demonstrating that the synthetic methods utilizing impregnation and co-precipitation, whether at a pH of 10 or 12, produces material having like crystallographic structure. Additionally, FIG. 1 also displays the LDH structure of different aluminum/magnesium crystallite sizes, along with the crystallinity at different catalyst synthesis conditions.

FIG. 3 shows x-ray diffraction spectra for four calcined catalyst samples having a composition of about 20.5% by weight NiO, about 5.5% by weight MgO, and about 75% by weight $Al_2O_3$, wherein the samples were calcined at a temperature of about 650° C. for a period of about 8 hours. The materials correspond to the calcined versions of the materials shown in FIG. 1. The spectra show that samples LO2C and CP2C both have peaks at about 38, 46 and 66, which correspond to mixed metal oxide (as opposed to LDH structures). Sample CP2C also includes a slight peak at about 60, corresponding to metal oxide. In contrast, sample LO1C has peaks at about 38, 42, 46, 63 and 66, and sample CP1C has peaks at about 38, 42, 62, and 66, although the peak at 66 is of a lower intensity.

Based on the experimental results, which are shown in FIGS. 1-3, Applicants surprisingly discovered the following:

(1) Catalysts obtained by calcination/reduction of LDH materials proved to be suitable catalyst materials for the autothermal reforming of liquid hydrocarbons for hydrogen production. These catalyst materials exhibit highly dispersed metallic crystallites or grains that are stable inside a matrix, and advantageously have a high surface area.

(2) The catalyst materials obtained in accordance with various embodiments of the present invention can be used in catalytic membranes to convert liquid hydrocarbons, steam, and air into hydrogen and carbon dioxide. The catalytic activities test produced nearly total liquid hydrocarbon conversion with large levels of hydrogen produced without any carbon monoxide production, thus indicating an excellent balance of ATR and WGS combined reactions. Additionally, the WGS reaction was favored over the methanation reaction, resulting in a reduced amount of methane gas being produced. Moreover, coke formation was also reduced, which improves overall catalytic activity, thus leading to longer run times.

(3) Nickel incorporated into the catalyst materials by co-precipitation results in more highly and finely dispersed nickel particles than the impregnation method.

(4) Synthesis parameters have an important influence on metal-support interaction. When stronger metal-support interactions are favorable, the catalyst structure is improved. Additionally, catalyst performance is strongly linked to the nickel particle size, as well as the selected support material and its properties.

As noted previously, prior art catalytic membranes were used to produce and subsequently remove hydrogen through hydrogen permeable metal membranes, such as palladium or palladium alloys. These membranes, in particular palladium or palladium alloys, however, are expensive, sensitive to sulfur compounds, and difficult to sinter with or co-sinter onto a catalyst layer. Additionally, such devices typically produced hydrogen only by the WGS reaction.

Some embodiments of the current invention integrate catalysts useful for both the ATR reaction and the WGS reaction, as well as providing a hydrogen permeable membrane that does not include palladium or a palladium alloys, which reduces costs while increasing the overall $H_2$ yield of the process. In one embodiment, the ATR structure described herein can be incorporated into a catalytic membrane reactor (CMR) assembly, which is operable to perform the ATR reaction, the WGS reaction, and remove hydrogen.

In one embodiment of the invention, a method for the production of hydrogen by oil reforming processes reduces the overall cost of producing high quality hydrogen from liquid oil, as compared to the prior art processes. In one embodiment, the method can include a gasification, steam reforming, partial oxidation, autothermal reforming, or like step, depending on the characteristic of the oil feed processed to obtain synthesis gas. This synthesis gas requires subsequent cleaning as it is shifted to produce additional hydrogen gas. In one embodiment, one or more of these steps can be combined to improve efficiency. In certain embodiments of the present invention, additional novel technologies, such as membrane separation and catalytic reactors, have been developed that can help to solve these needs. Additionally, some embodiments of the present invention are also operable to remove unwanted products, such as $CO_2$, to thermally provide one stream that can be used in a secondary process, such as in enhanced oil recovery from depleted oil reservoirs.

In one embodiment, methods for producing hydrogen from alternate hydrocarbon sources of oil (such as, gasoline, kerosene, diesel, petroleum coke, heavy residues, and the like) involves the step of first reacting oil with oxygen and/or steam to produce a gas mixture that includes carbon monoxide, carbon dioxide and hydrogen. The carbon monoxide can then react with steam to produce additional hydrogen and $CO_2$. Finally, the hydrogen and $CO_2$ can be separated, either by removing the $CO_2$ from the mixture or by removing hydrogen from the mixture. The removal of at least a portion of the hydrogen gas will advantageously shift the reaction equilibrium toward the product side, allowing a lowering of reaction temperature and use of a decreased amount of steam. An optional cleaning step can also be employed, but CO contamination can be controlled to make such contamination negligible. For example, concentrations of CO as low as 0.001% can be obtained, making the hydrogen substantially free of carbon monoxide. In certain embodiments, all of the hydrogen produced can be removed.

The combination of reaction and separation processes, as described herein for the CMR assembly built in accordance with embodiments of the present invention, offers higher conversion of the reforming reaction at lower temperatures due to the step of removing hydrogen gas from the steam reforming and WGS equilibrium reactions. Thus depending on the feed oil composition used, a membrane reactor as part of an engineering process, can allow one step reforming and/or partial oxidation with WGS reaction and parallel hydrogen separation. Unlike conventional prior art processes, the CMR assembly equipped with the catalysts described herein, benefits from high pressure operation due to the increased hydrogen partial pressure differences across the membrane, which act as the driving force for hydrogen permeation. For example, the pressure on the permeate side can be atmospheric or under vacuum. When a higher pressure on the retentate side is applied, the pressure difference across the membrane acts as a driving force for hydrogen to permeate through the membrane. The higher the pressure difference, the higher the amount of hydrogen permeating through the membrane. Those of ordinary skill in the art will recognize that the mechanical property of the membrane used will create a practical limit as to the pressure that can be applied on the retentate side.

Another embodiment of the present invention discloses a method of manufacturing a catalytic coated silica membrane for the conversion of liquid petroleum hydrocarbon fuels into high purity hydrogen. The embodiment includes the step of providing a membrane tube, which includes an outer surface covered with an active silica layer that is highly permeable to hydrogen. A mixed metal oxide catalyst, which can include at least one metal selected from the group consisting of rhodium, platinum, nickel, ruthenium, palladium, rhenium, iridium, and combinations thereof, can be deposited within the pores of the alumina framework of the membrane tube. During use, air, steam, and liquid hydrocarbons are transported through the membrane and are in intimate contact with the metal sites. Following activation of the catalyst membrane, the feed components react and form hydrogen through a combination of ATR and WGS reactions. High purity hydrogen can be produced by separation of the hydrogen gas from the product mixture through the hydrogen permeable membrane deposited on the CMR assembly outer surface. Certain embodiments of the present invention bring a number of benefits to hydrogen production from liquid petroleum hydrocarbon fuels. These improvements can include high conversion of the liquid hydrocarbons, high molar yield of the hydrogen produced, low molar yield of the residual methane and low catalyst deactivation as a result of the shifting of reaction equilibrium to favor the forward reaction to nearly 100% at a much lower operating temperature range between about 500° C.-550° C. Typical hydrogen purity in this one-step conversion of liquid petroleum hydrocarbon to hydrogen can range from about 96 to 99% molar concentration, alternatively at least about 97% molar concentration, alternatively at least about 98% molar concentration, or alternatively between about 97 and 99% molar concentration.

In one embodiment, the CMR assembly in accordance with an embodiment of the present invention can be selectively permeable to hydrogen and produce a hydrogen-rich permeate product stream on the permeate side of the membrane and a carbon dioxide rich product retentate. The CMR assembly can be used to produce a hydrogen-rich permeate product stream that is greater than about 99% by volume hydrogen. The CMR assembly can be a composite ceramic material having an outer hydrogen transport and separation layer, which in one embodiment is a metal doped silica. The CMR assembly can be also composed of one or more inner catalytic layers. The ATR and WGS reactions occur on the inner metal layers of the CMR assembly and the produced hydrogen can be transported and removed through the outer metal-doped silica layer.

In one embodiment, the metal catalysts are capable of catalyzing the conversion of hydrocarbon fuels to hydrogen and carbon oxides (CO and $CO_2$). In one embodiment, the catalyst can include one or more of the following metals: nickel, ruthenium, platinum, palladium, rhodium, rhenium, and/or iridium.

The CMR assembly can include a stainless steel vessel that surrounds the tubular support and is positioned between a pair of high temperature material shells. In one embodiment, the high temperature material shells can help to provide sealing, manifolding, expansion support, separated regions for the catalytic reactions, delivery of pressurized feedstock, support of the membrane, and removal of product gases.

In accordance with one embodiment of the present invention, the stainless steel vessel was constructed of 316 grade stainless steel. In an exemplary embodiment, a cylindrical α-alumina tube having an outer diameter of about 10 mm and an inner diameter of about 8 mm with an average pore size of 1.3 micro meters and an approximate porosity of 0.55 was used as ceramic tube support for the membrane. For the preparation of the active catalytic sites and the membrane separation pores, the following procedure was adopted:

First, the α-alumina ceramic tube was soaked in a boehmite sol-gel, having a concentration in the range of about 5 to 10% by weight boehmite. After removing the excess boehmite by drip drying, the ceramic tube was dried by natural convection at room temperature for several hours and then at about 110° C. for up to about 10 hours. It was followed with calcination at a temperature of about 500° C. that resulted in the bimodal distribution for the original α-alumina structure into alpha and gamma phases. During the calcination step, the nitrates and other gaseous oxides were evaporated and converted to the metal oxide form of the active metals and support structure (e.g., NiO, MgO, and $Al_2O_3$). For the materials used, the preferred calcination temperature was between 500° C. and 800° C. At temperatures above 800° C., it was discovered that the metal oxide structure changed to a dense, low surface area material, which greatly reduced its catalytic activity. To introduce the catalyst metal active sites to the tubular structure, the ceramic tube was soaked in a solution containing salts of metal species, such as nickel, ruthenium, platinum, palladium, rhodium, rhenium, iridium, and combinations thereof, at the appropriate concentration. Drying and calcination steps were subsequently performed, resulting in a uniform metal distribution within the core of the ceramic tubular structure. The final step was to dope the outer surface of the metal loaded catalytic ceramic tube with a silica colloidal sol-gel to produce an even thickness and uniform pore size hydrogen permeable layer. In one embodiment, this process can be repeated several times to remove large pores that might result in pinholes in the final membrane. In one embodiment, the silica colloidal sols were coated on the ceramic tube by a hot coating method in which the tube was first heated to a temperature of up to around 180° C. and then subsequently and quickly contacted with a wet cloth containing the sols. This hot coating method helped make the sol dry more quickly, preventing the sol from penetrating deep into the pores. The catalytic membrane can be cut in pieces and then characterized by Scanning Electron Microscopy (SEM), nitrogen adsorption, porosimetry and hydrogen adsorption.

In order to test the hydrothermal stability of the silica membrane, a stability experiment was carried out at about 500° C. using several different molar ratios of steam and liquid hydrocarbon. The permeability-selectivity of the ceramic tube to hydrogen was measured at timed intervals. In general, a very slow drop in the permeation characteristics due to humidity was observed. Typically, at high temperature, silica interacts with steam causing densification of the material. Within the temperature ranges used in the experiment (e.g., between about 500° C. and about 600° C.), the membrane did not show any substantial change in its permeation properties. In addition, the influence of the molar ratio of water (steam) to hydrocarbon on liquid hydrocarbon conversion within the temperature range of 500° C. to 550° C. showed that the conversion was enhanced at high steam to hydrocarbon molar ratios, such as a steam to hydrocarbon molar ratio of greater than about 3:1, or alternatively between about 2:1 and about 3:1. The hydrocarbon feed reacted very effectively with steam and air through the ATR reaction steps. A fraction of the CO produced during the ATR reaction subsequently reacted with steam in the WGS reaction, leading to increased hydrogen yield. In-situ removal of hydrogen by the membrane further enhanced conversions of both of these reactions. In addition, enhancement in the rate of CO removal by the WGS reaction can reduce coke deposition caused by the so-called Boudouard reaction.

Figure 4:
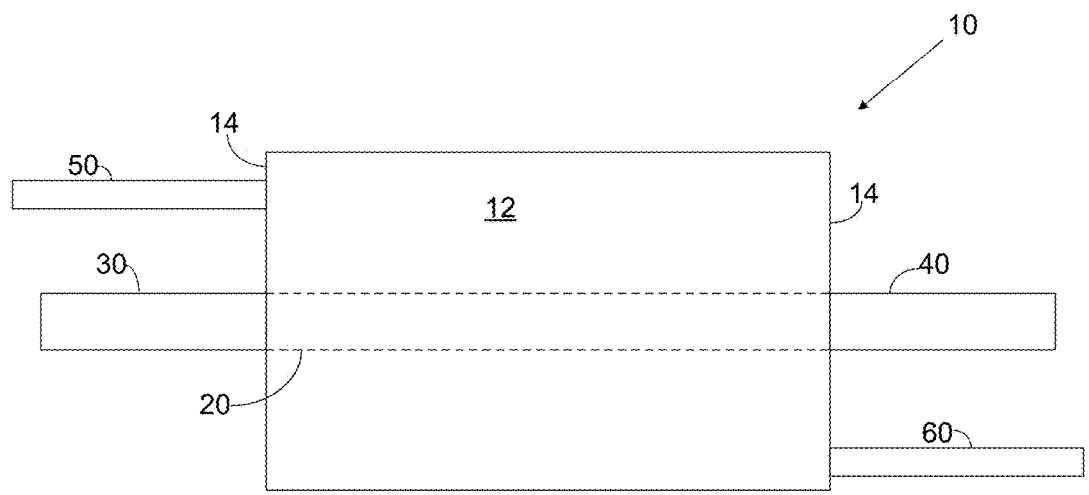
FIG. 4 is an embodiment of the present invention.

In FIG. 4, CMR assembly 10 includes: stainless steel vessel 12, shells 14, ceramic tube 20, feed stream inlet 30, retentate output 40, sweep stream inlet 50, and permeate output 60. The feed stream (not shown), which includes liquid hydrocarbons, steam, and the oxygen source, enters CMR assembly 10 thru feed stream inlet 30. The feed stream then moves into ceramic tube 20 where it undergoes both ATR and WGS reactions, thereby forming hydrogen and carbon dioxide. The hydrogen that permeates thru the permeable membrane of ceramic tube 20 is removed by a sweep gas, such as nitrogen, argon, steam, and combinations thereof, that enters thru sweep stream input 50 and exits permeate output 60.

Figure 5:
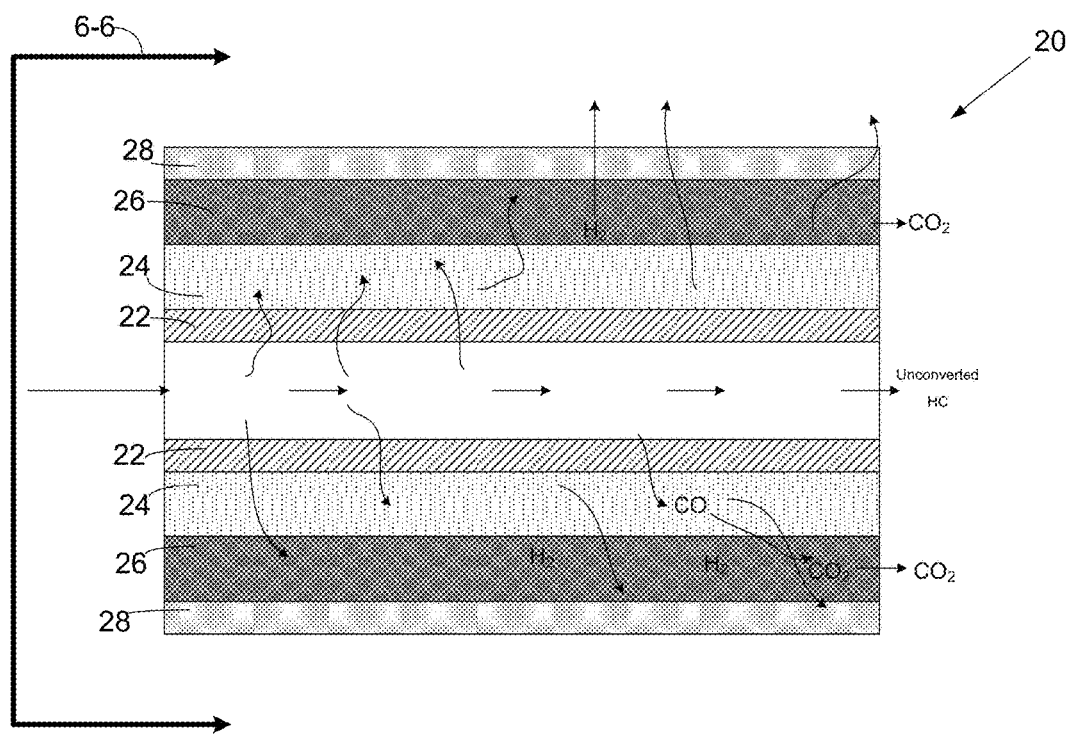
FIG. 5 is cross sectional view of an embodiment of the present invention.

FIG. 5 shows an embodiment in which ceramic tube 20 has ATR layer 22 and WGS layer 24 disposed within the tube in two separate layers. Those of ordinary skill in the art will recognize that the ATR catalysts and WGS catalysts can also be disposed within the same layer. In the embodiment shown in FIG. 2, the feed stream enters ceramic tube 20 where it reacts with ATR catalysts disposed in ATR layer 22. This reaction converts the hydrocarbon, oxygen, and steam in the feed stream into hydrogen gas and carbon monoxide gas. The carbon monoxide can react with additional steam and the WGS catalysts disposed in WGS layer 24 to form carbon dioxide and additional hydrogen gas. The hydrogen gas then travels radially outward through the pores of γ-alumina layer 26 and then through membrane 28. The carbon dioxide gas cannot permeate membrane 28, and exits ceramic tube 20 on the retentate side of membrane 28. Unconverted hydrocarbons and carbon dioxide exit ceramic tube 20 through retentate output 40 of FIG. 4.

Figure 6:
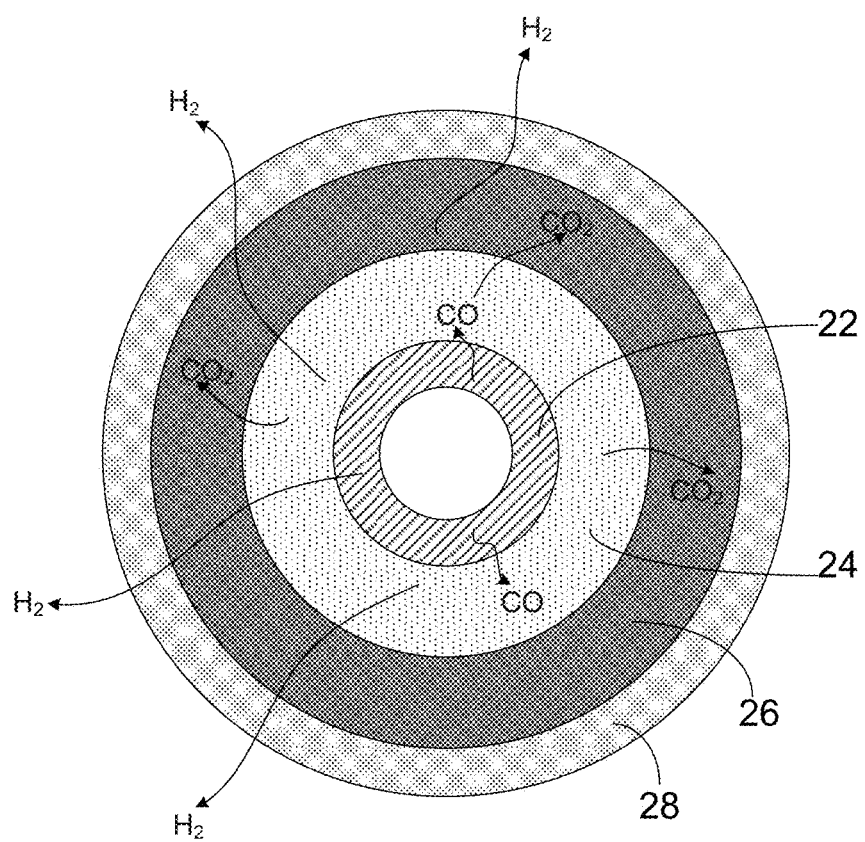
FIG. 6 is an axial view of an embodiment of the present invention.

FIG. 6 is an axial view of ceramic tube 20 as shown in FIG. 5 along line 6-6.

Experimental Design for CMR Assembly:

Commercial alumina tubes (obtained from Noritake, Japan) of 100 mm length and 10 mm ID were used for the CMR assembly. The tubes include α-alumina having a porosity of about 30% and average pre size of about 0.5-1 µm. A γ-alumina layer having a pore size of about 4 nm was disposed on the outer surface of the tubes. A metal doped sol-gel was prepared by mixing 120 g of tetraethyl orthosilicate (TEOS) in 600 g ethanol to form a solution. An acid solution was then synthesized by dissolving 14.84 g cobalt nitrate hexahydrate ($Co(No_3)_2.6H_2O$) in 51.77 g of 30% aqueous $H_2O_2$. Subsequently, both solutions were vigorously mixed together by stirring for about 3 hours in ice-cooled bath. The tubes were then externally coated with a stable Si—Co—O solution using a controlled immersion time of 1 minute and withdrawn speed of 2 cm/min. Sintering was then carried out at about 600° C. for about 4 hours at a heating rate and a cooling rate of 0.7° C./min.

The internal area of the alumina tube was wetted with a sol-gel that includes a boehmite solution having a concentration in the range of 5-10 wt % of aluminum. Excess solution was wiped off, and the tube was dried for several hours at a temperature of about 110° C., and then fired at a temperature of about 500° C. for about 8 hours, which resulted in an inlet tube wall of γ- and α-alumina having a bimodal distribution. Subsequently, this internal layer of the tube was soaked with chloroplatinic acid and rhodium chloride solutions (0.5 wt % platinum and 2.5 wt % rhodium, respectively), followed with drying, calcination, and reduction under hydrogen to finely disperse the active metal particles over the γ- and α-alumina pores.

In one embodiment for the preparation of the chloroplatinic acid and rhodium chloride solutions, the following procedure was used: TEOS was mixed together with the metal solutions, water and ethanol according to the following:

| | |
|---|---|
| TEOS: | 0.9 parts |
| Pt—Rh: | 0.5 to 2.5 parts |
| Water: | 4 parts |
| $HNO_3$: | 0.01 parts |
| Ethanol: | 10 parts |

Afterwards, the resulting solution was hydrolyzed for about 12 hours at room temperature. After adding an appropriate amount of a 0.1 M solution of nitric acid, the solution was left at room temperature for about 5 hours to convert into a colloidal sol solution. It was then used to coat the internal wall of the membrane tube.

A silica metal doped hydrogen separation layer having a thickness of about 1 µm was formed on the external wall of the membrane tube. An internal, highly dispersed Rh—Pt catalytic layer, having a metal dispersion of about 65%, was impregnated on the bimodal layer (which includes α- and γ-alumina) to act as a catalytic layer for the simultaneous ATR and WGS reactions to occur in the internal wall of the membrane tube.

Figure 7:
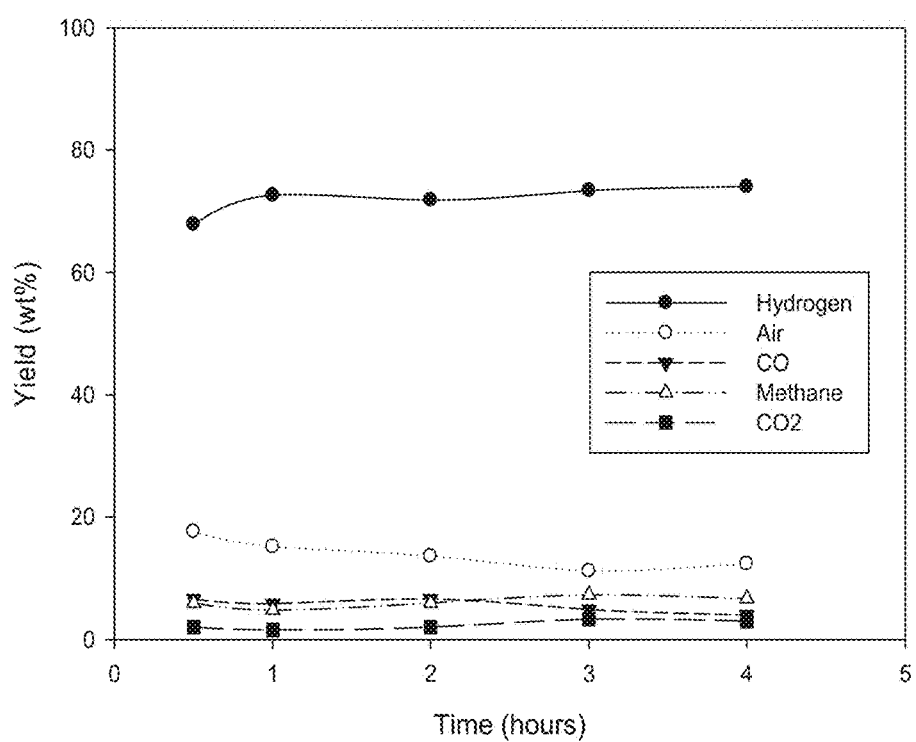
FIGS. 7-27 include graphical representations of experimental data collected in accordance with embodiments of the present invention.

Experimental Results of CMR Assembly:

A set of initial experiments were conducted using the CMR assembly described above and shown in FIGS. 4-6, and a commercially available autothermal catalyst (FCR-71D autothermal catalyst provided by Sud Chemie). One gram of the commercially available catalyst was used under similar experimental conditions tested on a fixed bed reactor (FBR) during catalyst selection: Temperature of 500° C.; Pressure of 3 bars; oxygen:carbon ratio of 1:2; steam:carbon ratio of 3:1; and a hydrocarbon feed of commercial gasoline. FIG. 7 shows the total gas product distribution at the end of both the retentate and the permeate side of the membrane. Hydrogen concentration on the permeate side was observed to be as high as 92% by volume. A 77 wt % recovery of hydrogen was obtained, with the remainder of the product stream being a mixture of carbon monoxide, carbon dioxide, methane and unconverted oxygen. A total conversion of about 98% of commercial gasoline was achieved.

Figure 8:
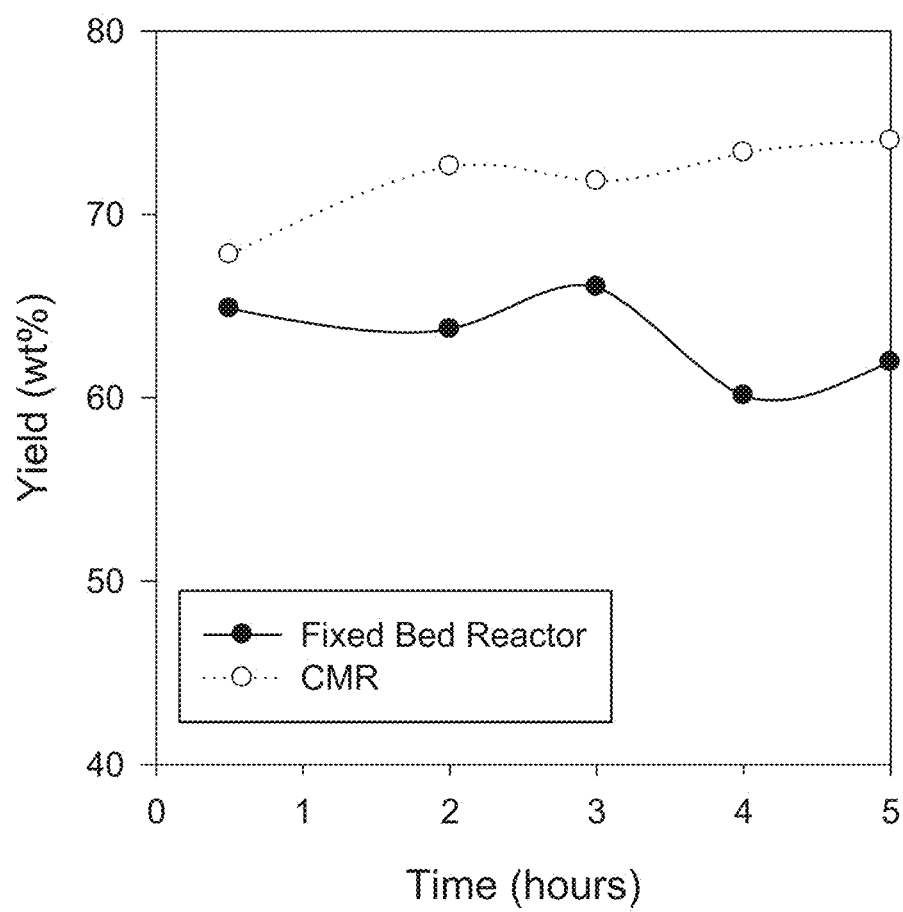

The hydrogen yield produced using a fixed bed reactor system and when using a CMR assembly was compared and can be seen in FIG. 8. As shown in FIG. 8, embodiments of the present invention utilizing the CRM assembly provide a distinct advantage over fixed bed reactors due to shifting the conditions of the reaction equilibrium.

Figure 9:
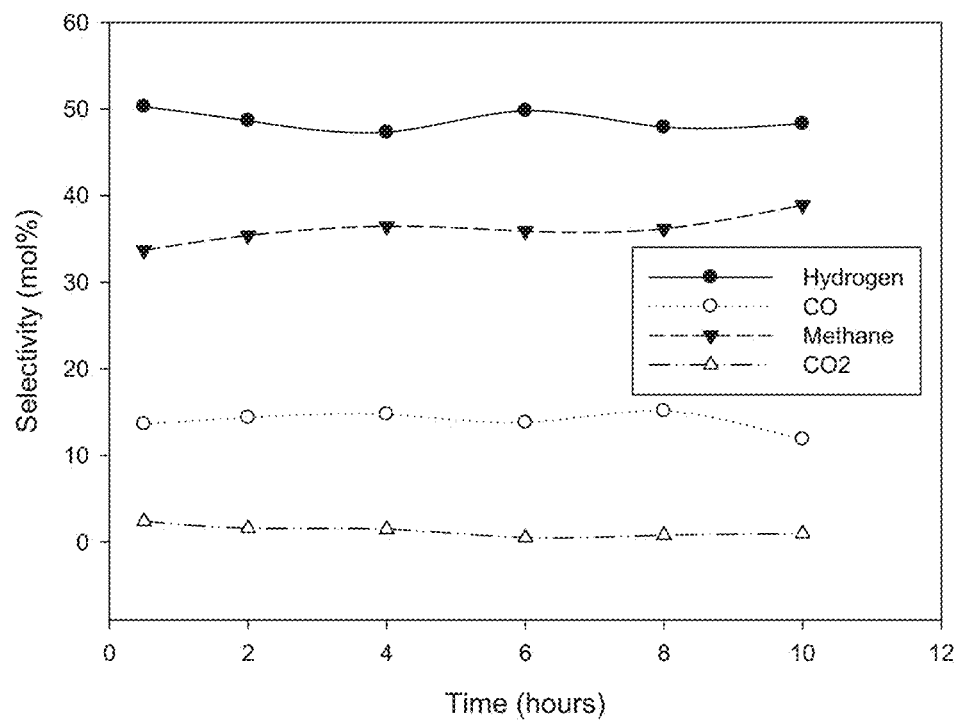
Figure 10:
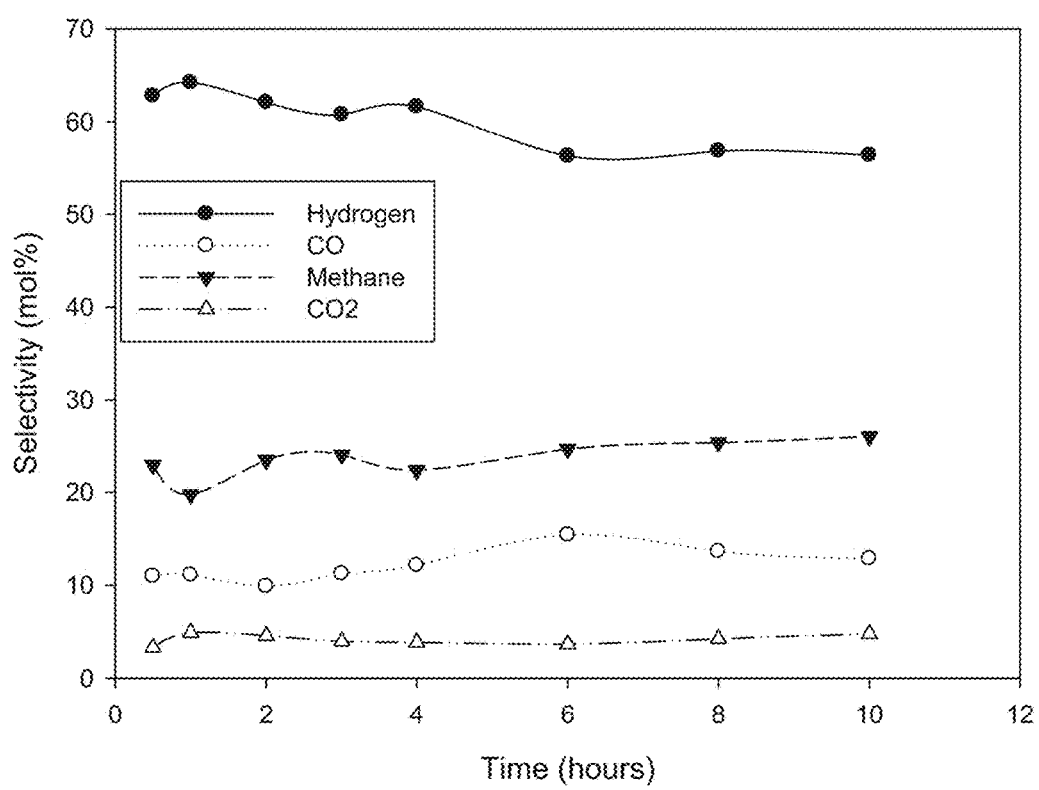

In FIGS. 9 and 10, the temperature was increased to 550° C. Notably, the CMR reactor had a higher selectivity of hydrogen (about 15% more) as compared to the fixed bed operation. Additionally, as shown by comparing FIG. 9 and FIG. 10, the CMR operation reduced the production of methane by approximately 40%, as compared with the fixed bed reactor.

Figure 11:
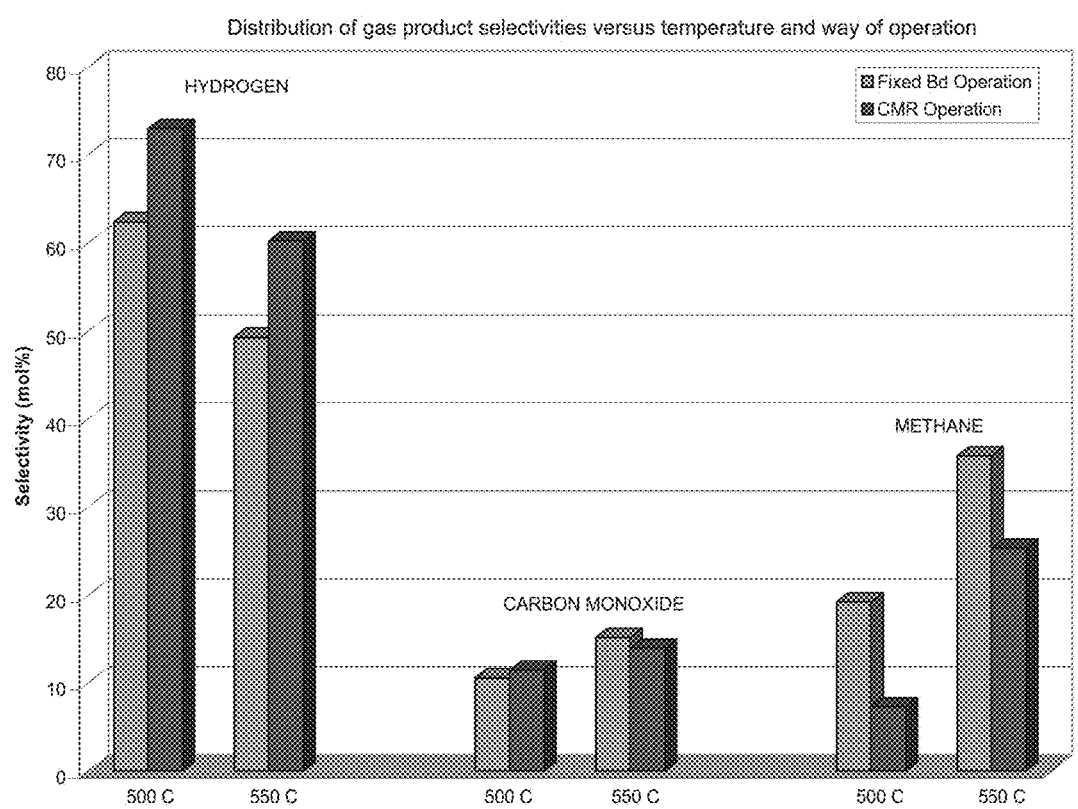

FIG. 11 shows comparisons of the average concentrations of hydrogen, carbon monoxide and methane in the product streams for fixed bed operation and CMR operation as function of temperature (500° C. and 550° C.). Comparing both fixed bed reactor and CMR operations, an increased amount of hydrogen is produced at an operating temperature of 500° C. than is produced at an operating temperature of 550° C. Additionally, at increased temperatures, the reduction in methane produced is very significant. On the retentate side of the reaction, analysis of the CO demonstrates nearly the same values for both operations.

Figure 12:
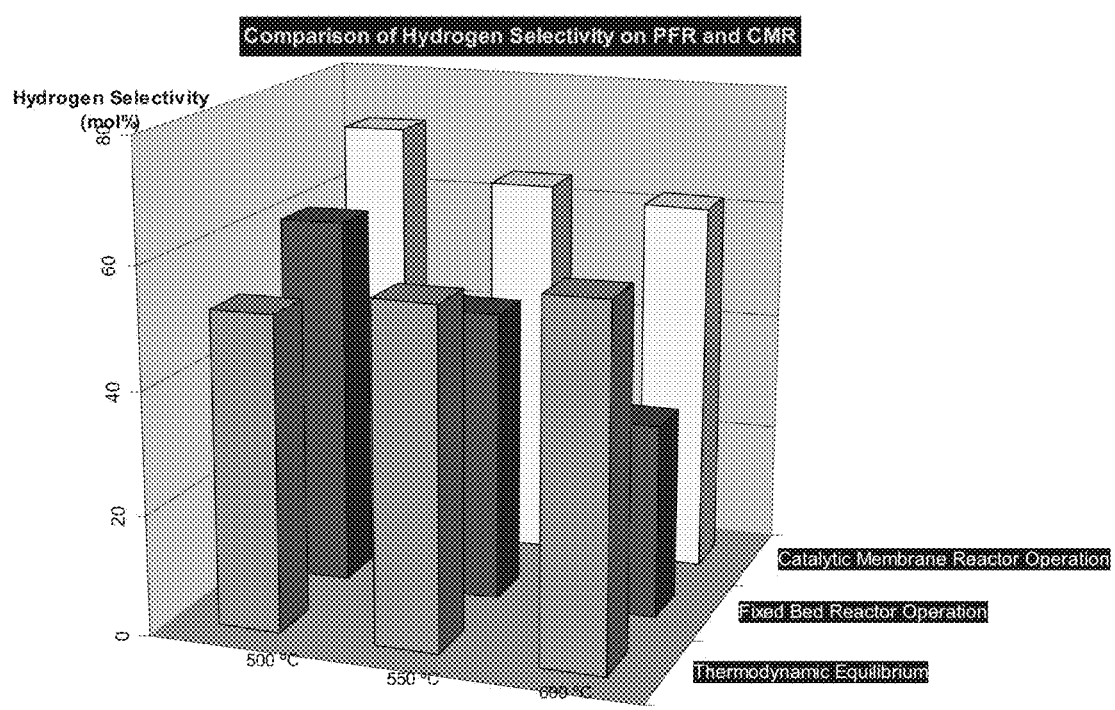

The strength of the silica membrane and the hydrogen separation through the retentate was tested for both the CMR and FBR reactors at 600° C., using the same reaction parameters as provided above with respect to FIGS. 7-9. The experiment was conducted for about 6.5 hours, however, after completion, leaks were observed through the membrane and through the graphite sealing. FIG. 12 represents a comparison of the results on hydrogen selectivity are compared as function of temperature and type of reactor used. As shown in FIG. 12, hydrogen is produced in amounts greater than the thermodynamic equilibrium conditions at temperatures of 500° C. and 550° C. Additionally, both CMR and fixed bed reactors show decreased hydrogen selectivity with increased temperature.

Figure 13:
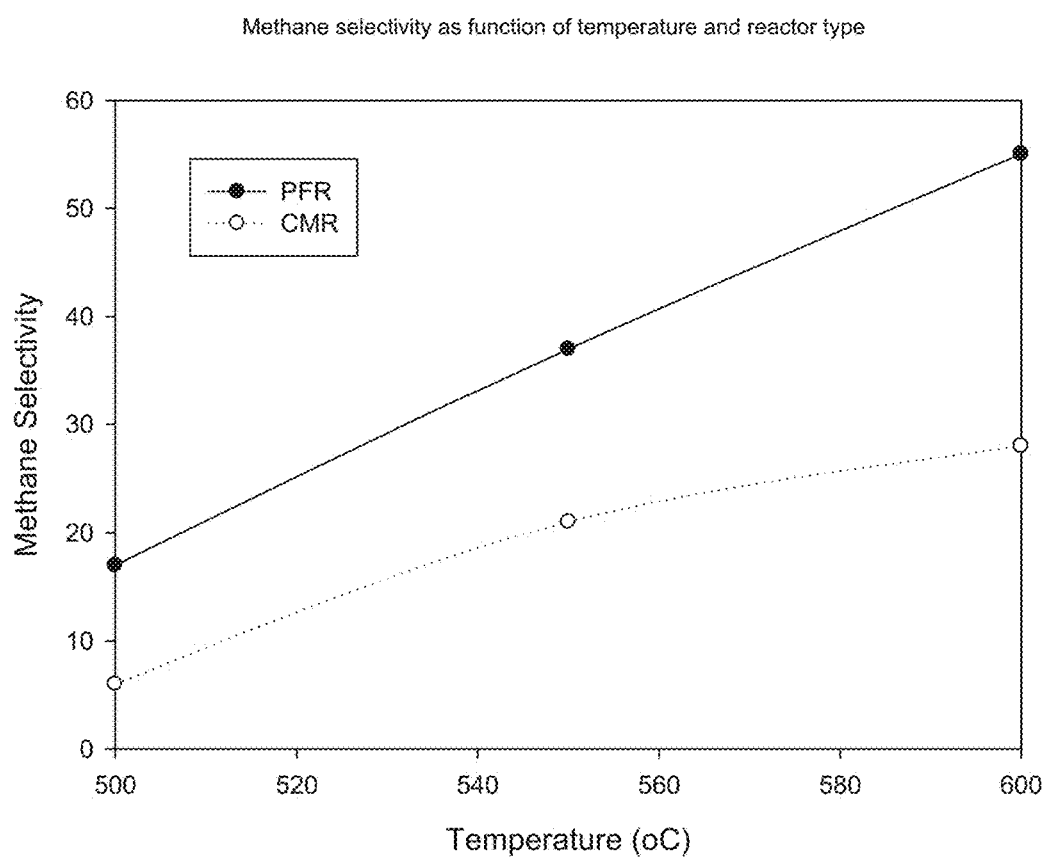
Figure 14:
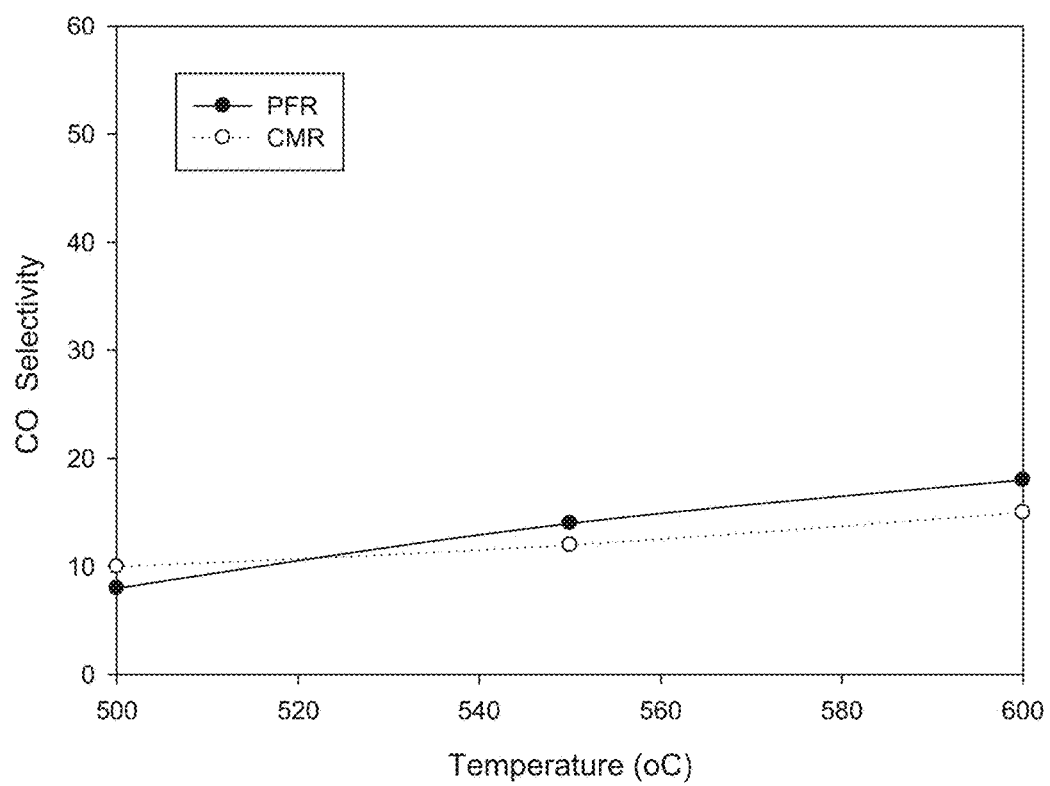

FIGS. 13 and 14 compare the selectivity of two reactors to methane and carbon monoxide. When using CMR operation, the methane yield is significantly reduced compared with the values for FBR. This behavior can be attributed to the fact that in using the CMR device, the thermal cracking reaction of the fuel and the Boudouard reaction that causes methanation, are inhibited because hydrogen is continually being removed through the silica membrane, which in turn causes more carbon monoxide to be consumed. On the other hand, the carbon monoxide yield between the two operation modes remains practically unchanged. As such, CMR operations increase yields of hydrogen, reduce yields of methane, and have a negligible effect on carbon monoxide production.

Table I presents the comparison of gasoline conversion, total hydrogen produced and the percentage of hydrogen recovered through the membrane as function of the reaction temperature. Increased reaction temperature favors the hydrogen recovery from the membrane, although the total hydrogen yield decreased.

TABLE I

Composition Production for CMR as a Function of Temperature

| Temperature (Celsius) | Gasoline Conversion (%) | Hydrogen produced (mol %) | % Hydrogen Recovered |
|---|---|---|---|
| 500 | 89 | 72 | 90 |
| 550 | 94 | 64 | 94 |

Figure 15:
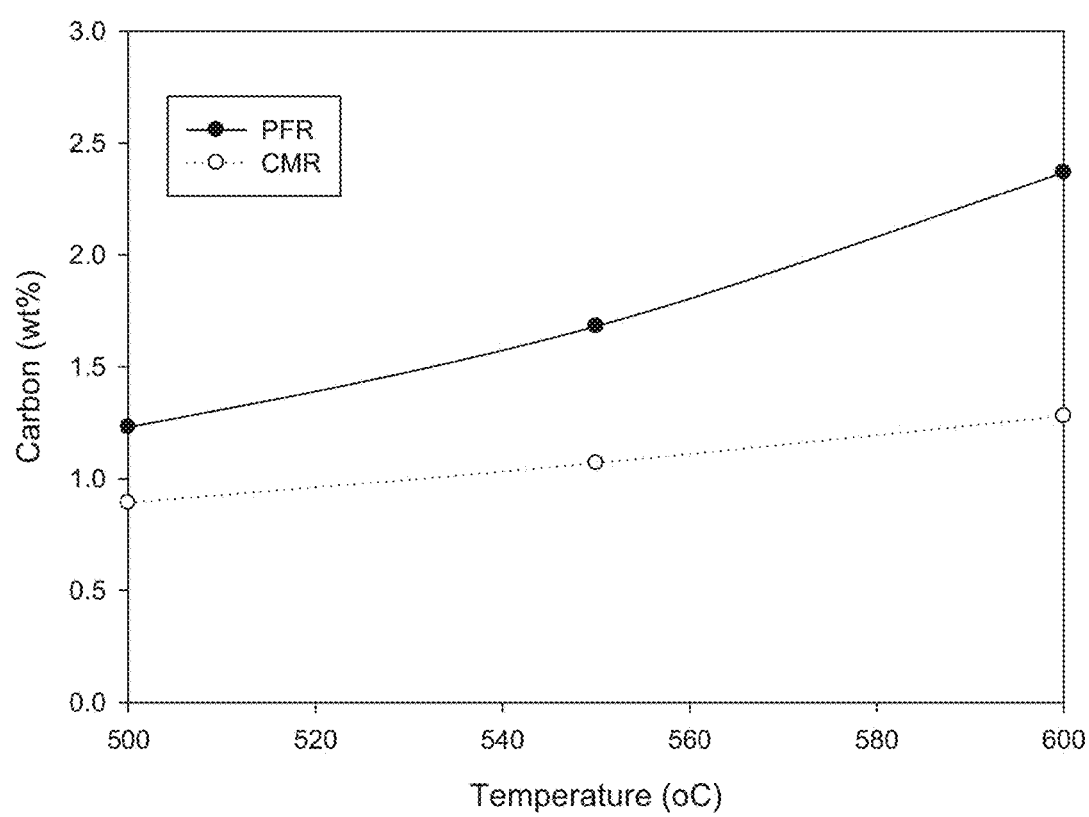

FIG. 15 shows the levels of catalyst deactivation for the two types of reactors. As shown in FIG. 15, carbon deposition on the catalyst surface is lower for CMR operation as compared with FBR operations. Additionally, carbon deposition on the catalyst surface is nearly independent of temperature for CMR operation, contrasting with FBR operation where carbon deposition increased by nearly 100% as the temperature was increased from about 500° C. to about 600° C.

Figure 16:
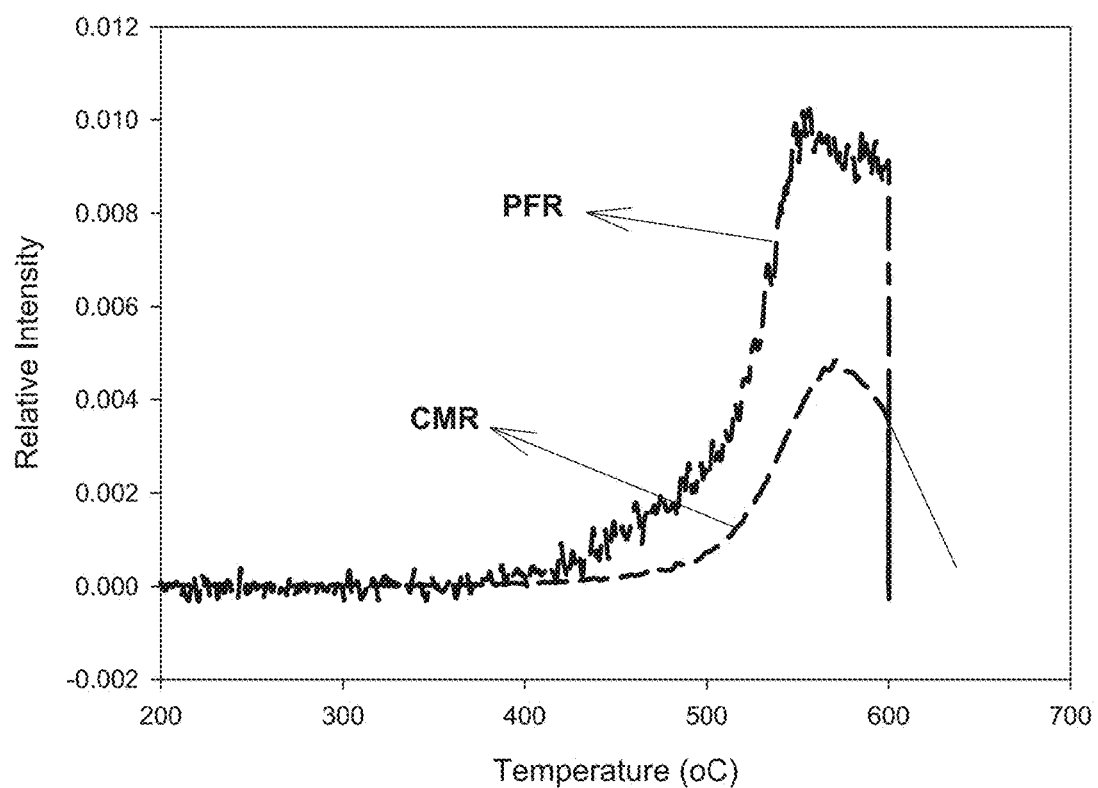

Coke deposit selectivity can be seen in FIG. 16, which shows the temperature programmed oxidation (TPO) analysis of the coked catalysts using CMR and FBR operations. The results indicate that coke deposition from catalysts used in CMR operation mainly covers the support sites of the catalysts, thereby leaving the metal active sites clean and free from deactivation. FBR, on the other hand, shows deposition on support sites and also on metal sites and in the vicinity of metal-support sites. This coke deposition can break the reaction chain to produce hydrogen as reflected by the high methane and light unsaturated hydrocarbons that were found during FBR operations.

Figure 17:
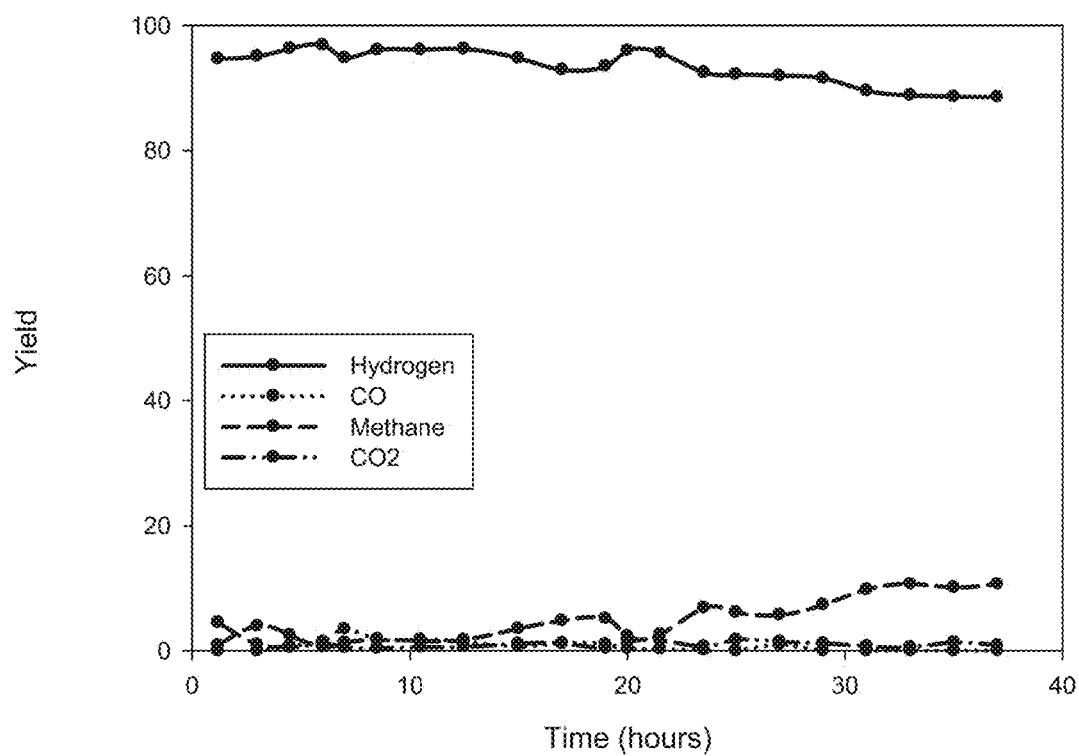
Figure 18:
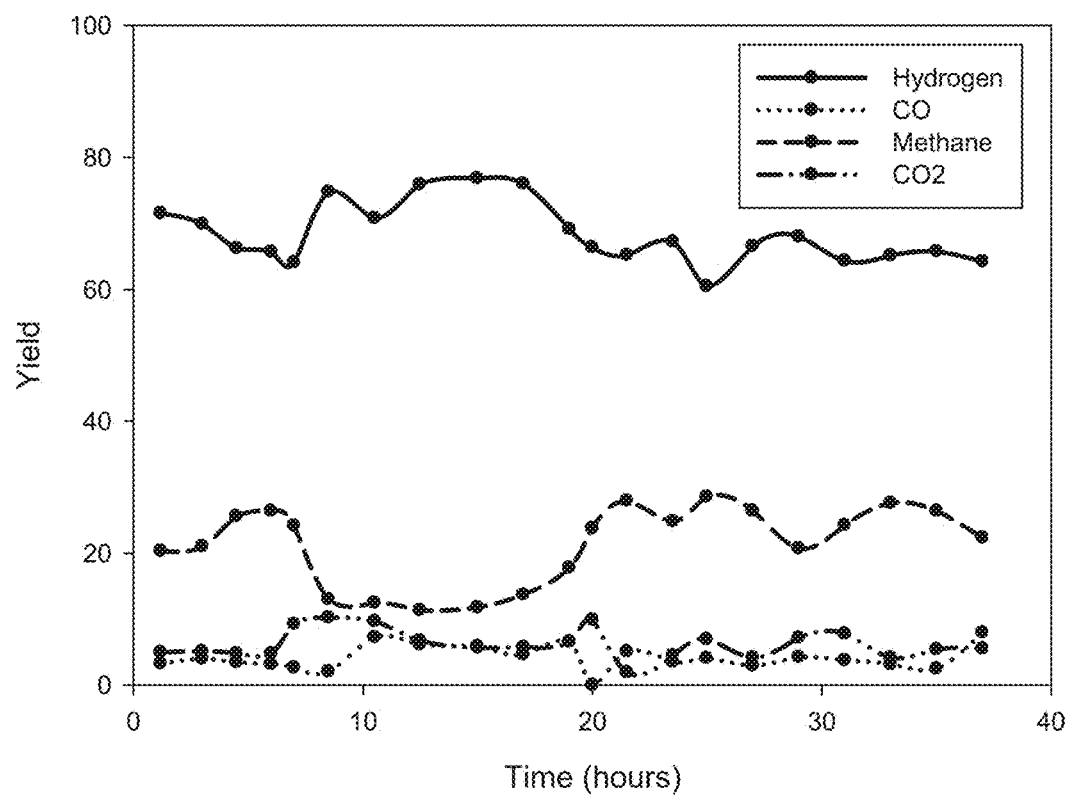

FIGS. 17 and 18 show the gas selectivity for permeate and retentate for the membrane sample CMR-1. In this case, hydrogen purity in the permeate was greater than about 95 mol %. Relatively low amounts of CO and methane were produced, which is an indication that the methanation reaction is suppressed and the WGS reaction is enhanced.

Figure 19:
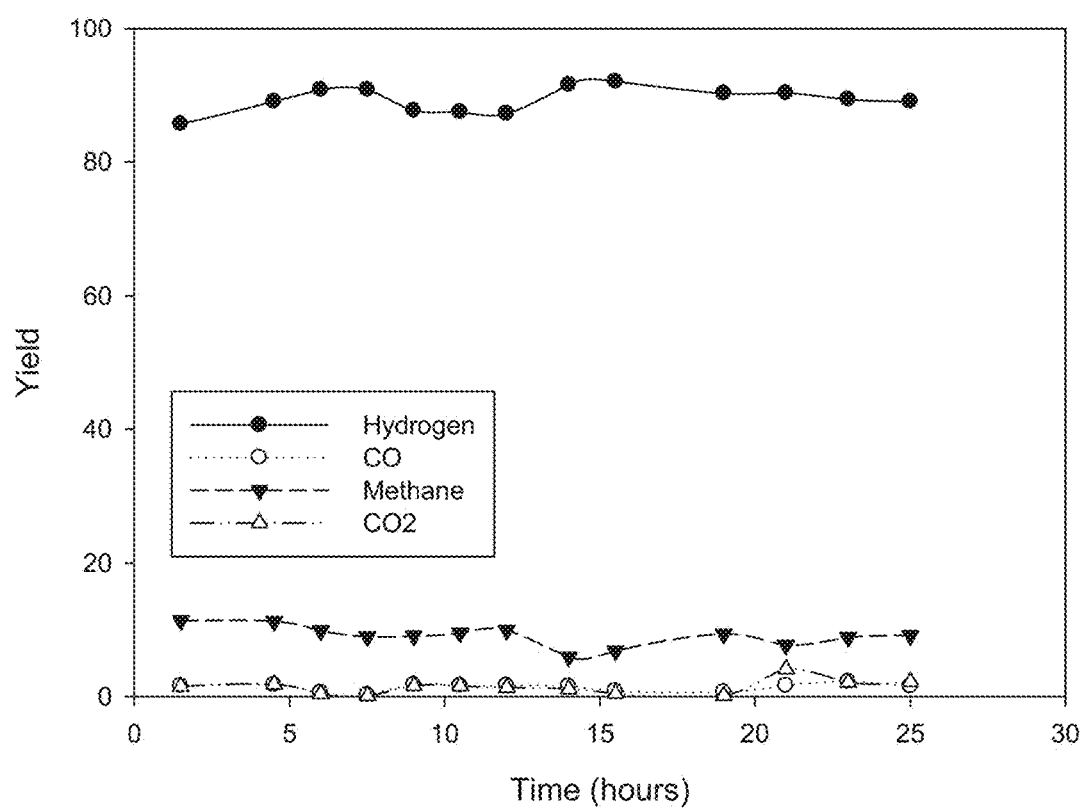
Figure 20:
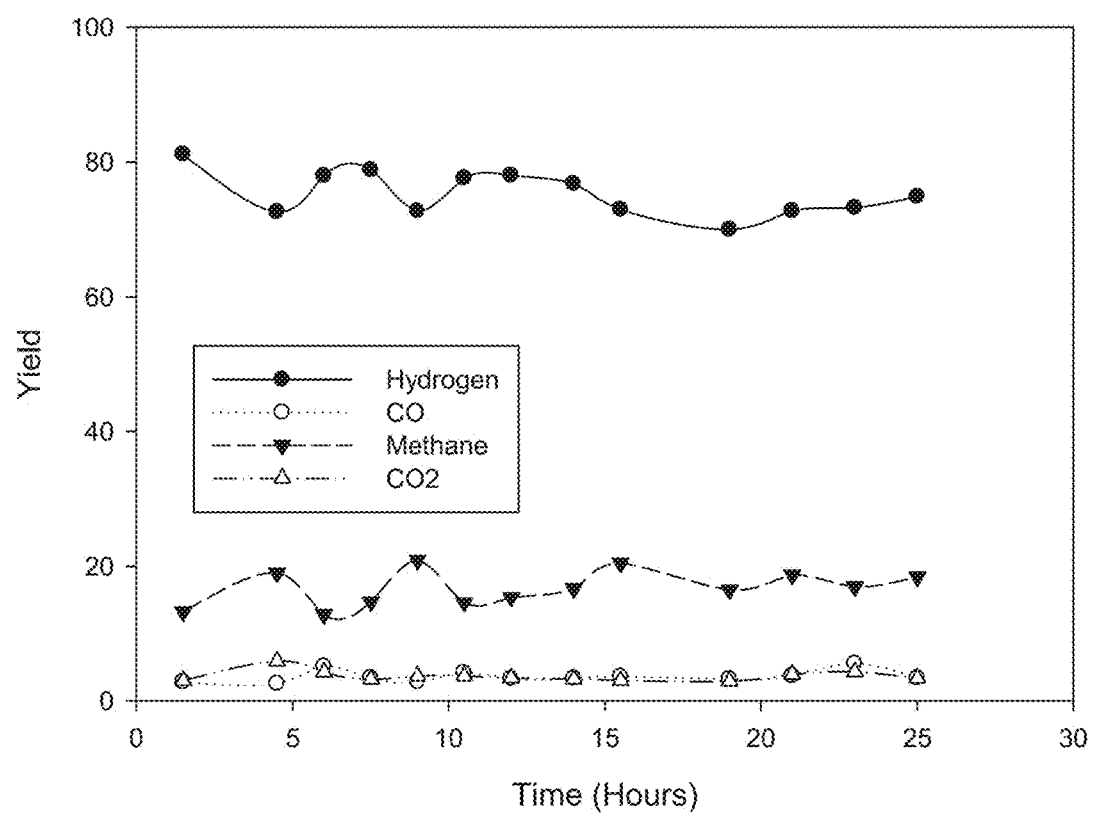

FIGS. 19 and 20 show the gas selectivity for permeate and retentate for membrane sample CMR-2. CMR-2 is a tube having similar physical characteristics to that of CMR-1, and it was used to show reproducibility. Similar to CMR-1, CMR-2 displayed a high hydrogen purity in permeate of around 90 mol %. CMR-2 also showed good membrane stability and very low production of CO and methane, which is an indication that the methanation reaction is suppressed and the WGS reaction is enhanced.

Figure 21:
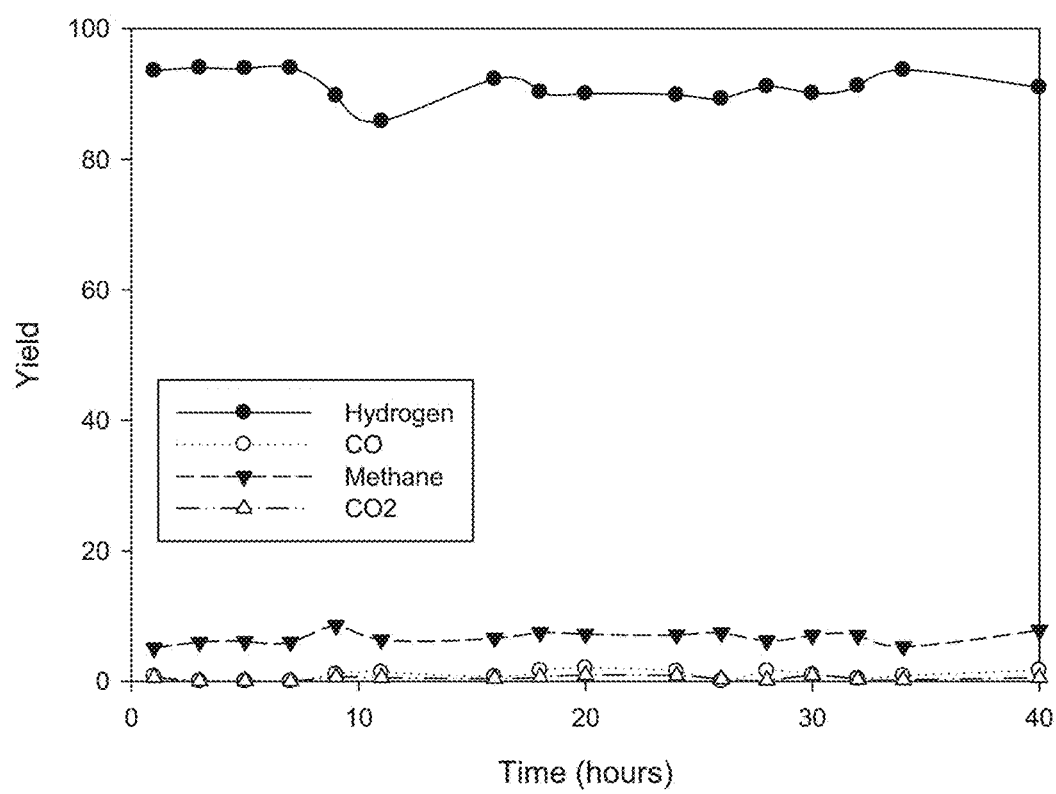
Figure 22:
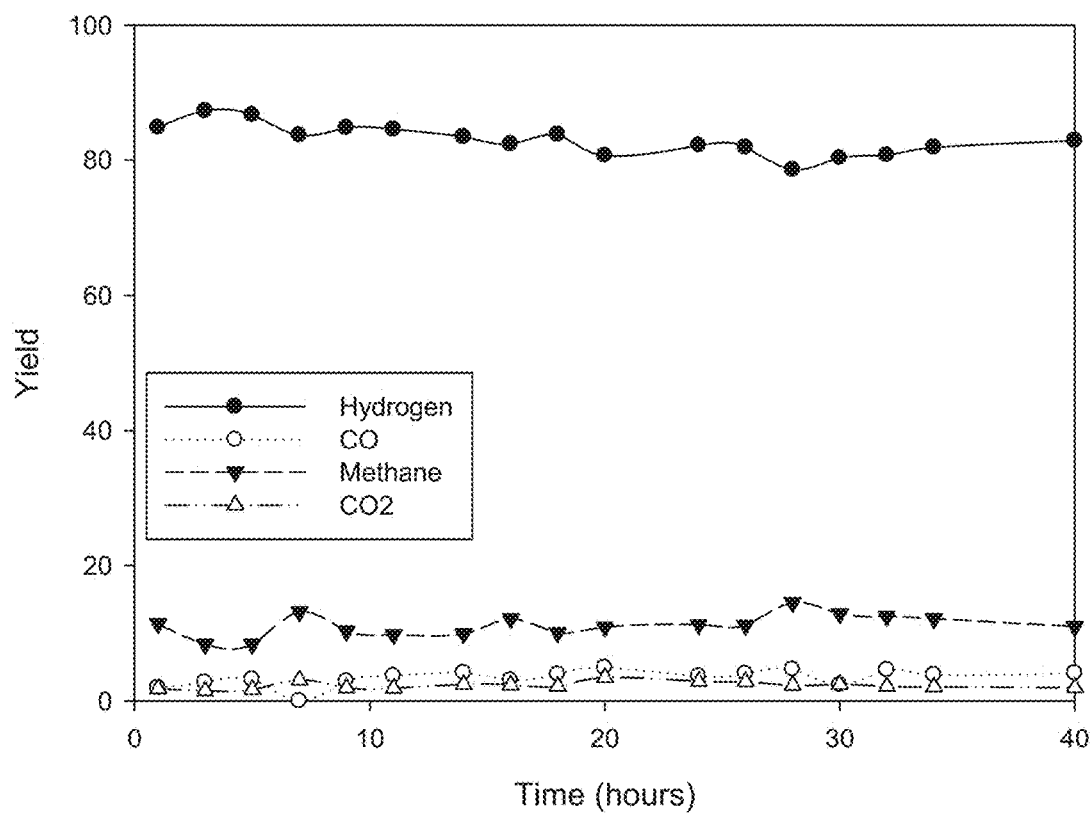

FIGS. 21 and 22 show the gas selectivity for permeate and retentate for membrane sample CMR-3. CMR-3 is a tube having similar physical characteristics to that of CMR-1 and CMR-2; however, it was from a different supplier, and was used to show reproducibility. Similar to CMR-1 and CMR-2, use of CMR-3 resulted in a high hydrogen purity in permeate of around 90 mol %. CMR-3 also showed good membrane stability and very low production of CO and methane, which is an indication that the methanation reaction is suppressed and WGS reaction is enhanced.

Figure 23:
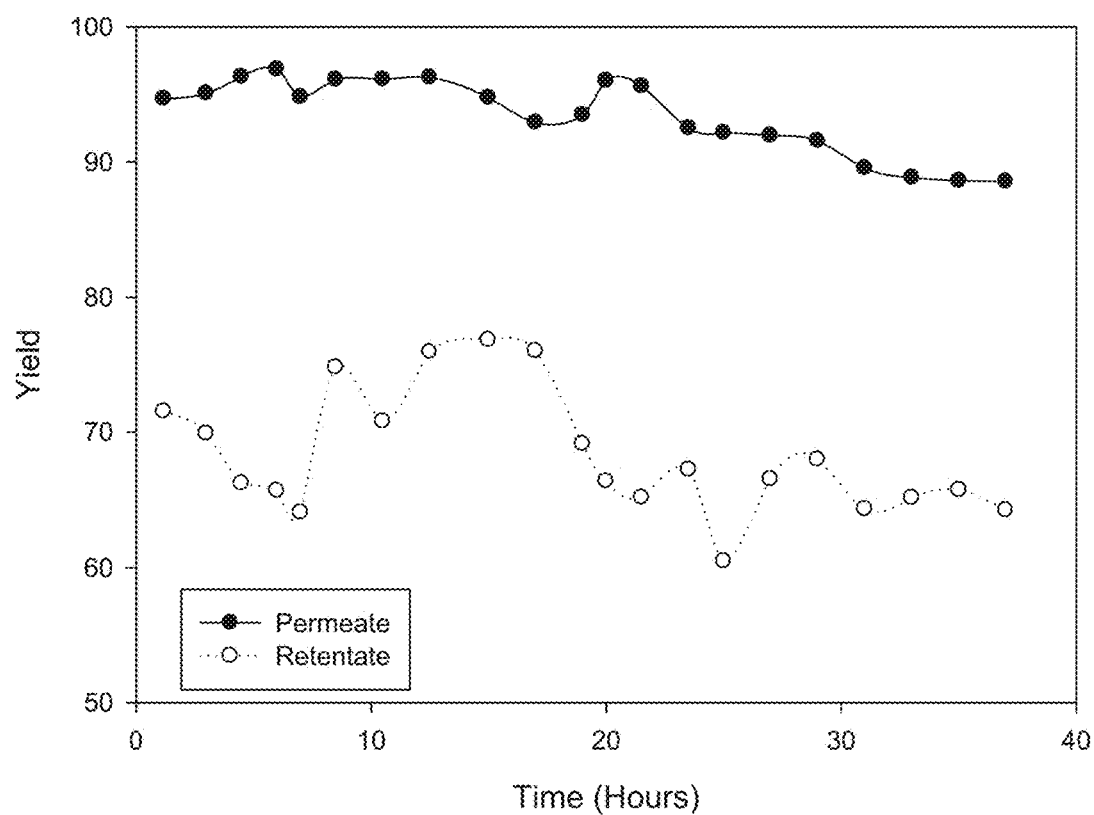
Figure 24:
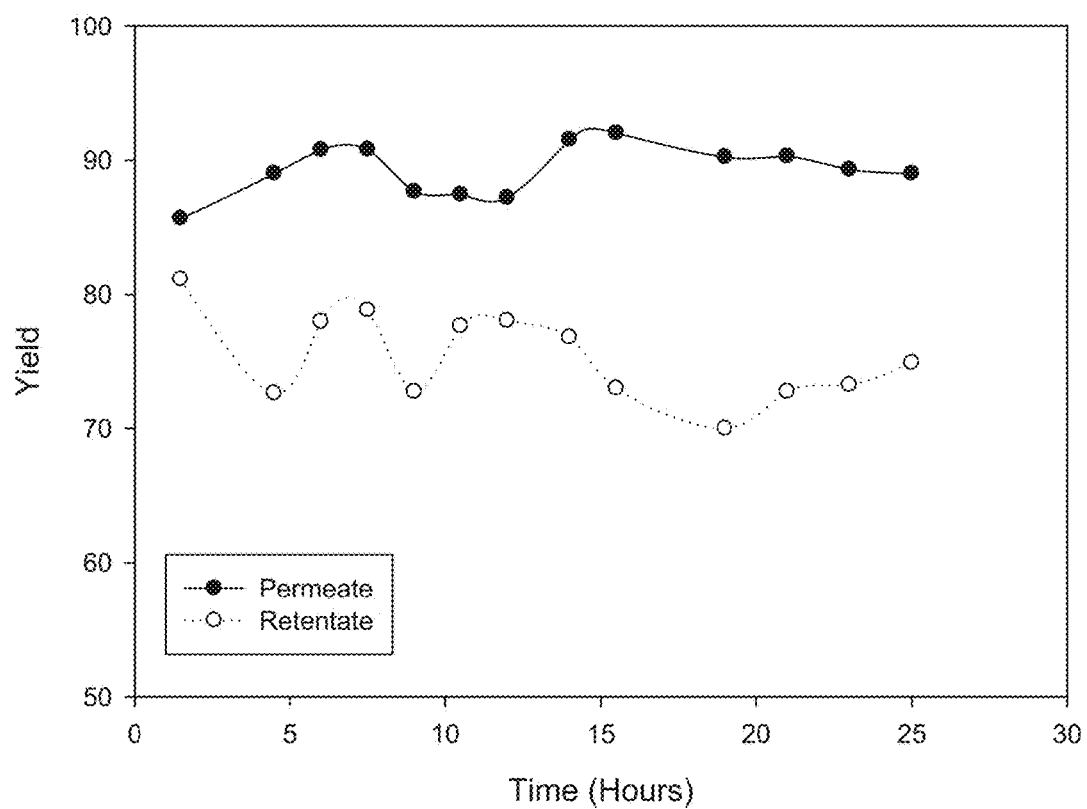
Figure 25:
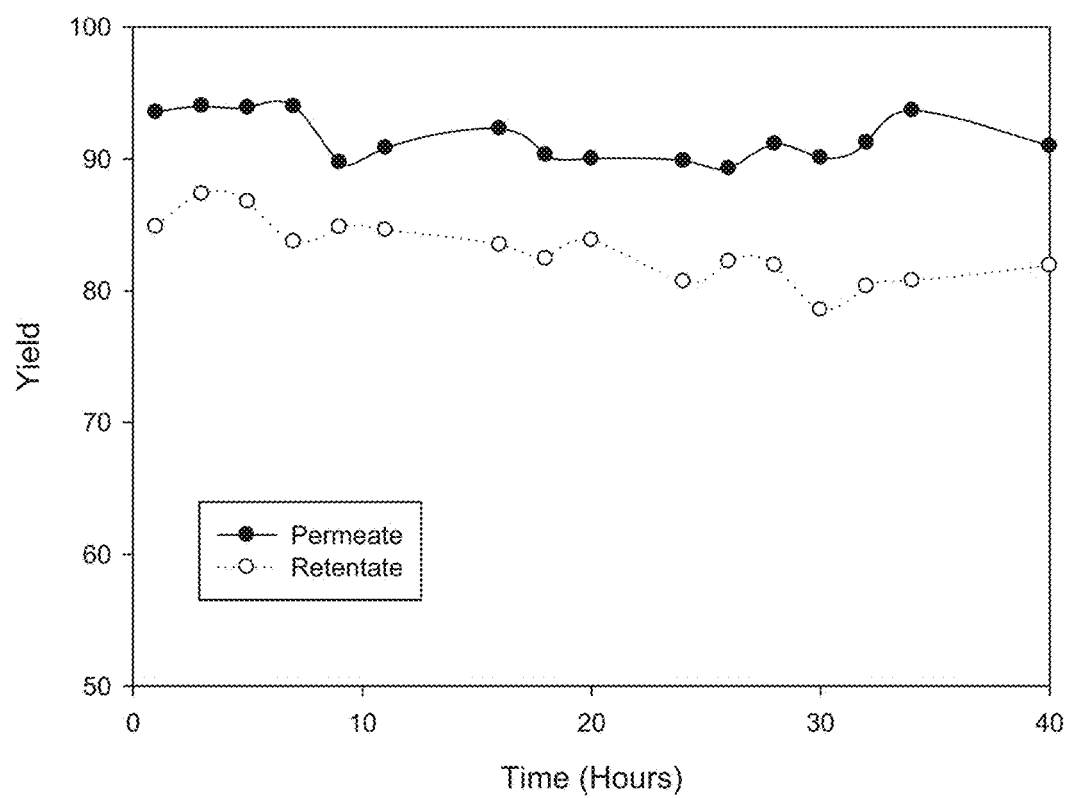
Figure 26:
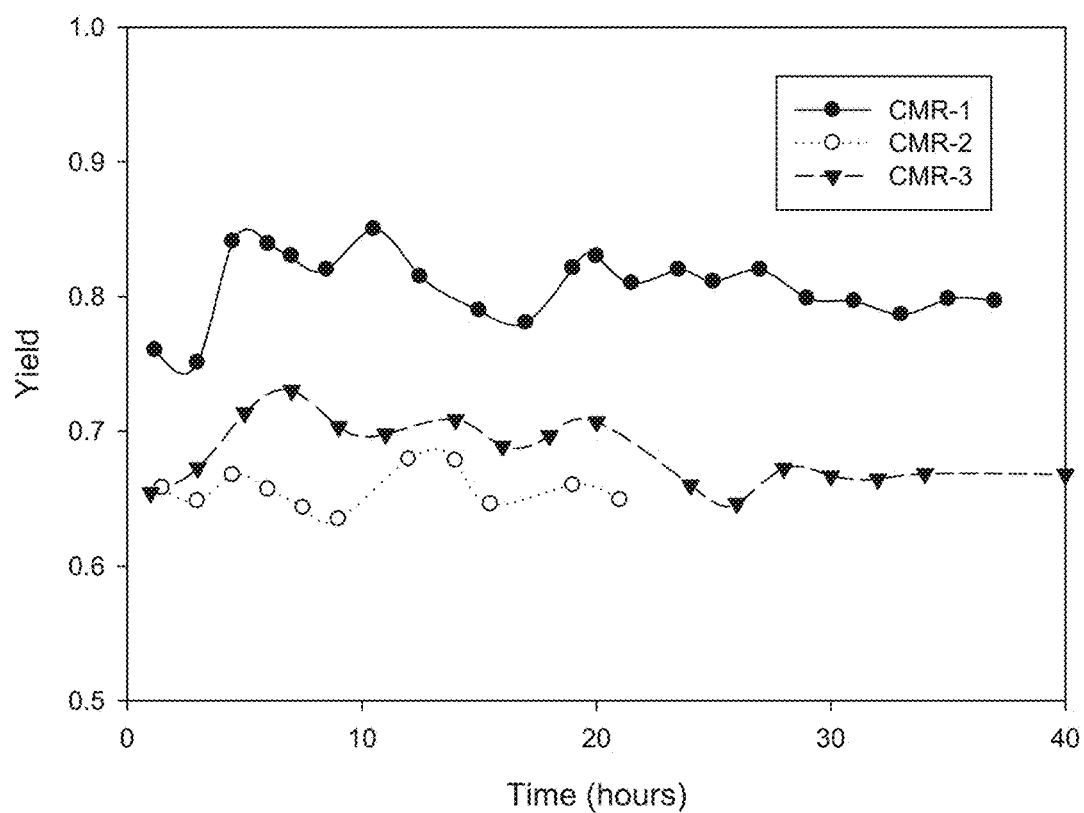
Figure 27:
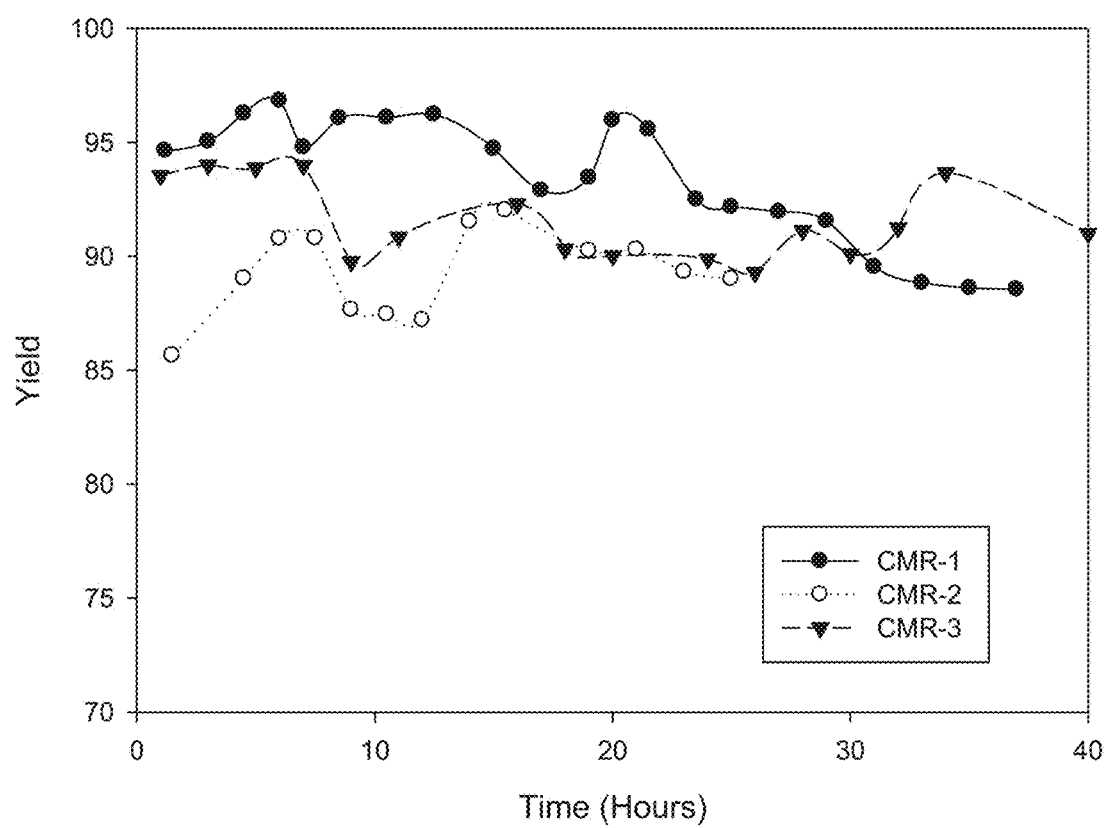

FIGS. 23-25 show the hydrogen purity concentration on permeate and retentate for each of the 3 membranes; CMR-1, CMR-2 and CMR-3. FIGS. 23-25, show that CMR-1 has the largest differences in hydrogen purity between the permeate and the retentate, indicating that CMR-1 is the membrane with the best hydrogen recovery rates (i.e., about 82%), which is shown in FIGS. 26 and 27.

There are various alternative uses for the CMR assembly as constructed. For example the membrane system can be used as a hydrogen extractor for removing hydrogen from refinery gas streams such as the catalytic cracker off gas, hydrodesulfurization gas, etc. Other uses can also include hydrogenation, dehydrogenation, fuel cells, and the like.

By integrating a hydrogen perm-selective silica layer with a reforming catalytic layer, an efficient and compact CMR assembly for reforming liquid hydrocarbon fuels into hydrogen has been shown. The system shows increased performance in the reforming of liquid hydrocarbons, at comparatively lower operating temperatures and lower steam to carbon molar ratios, than is typically the case for conventional fixed-bed reforming processes. The process efficiency, to a large extent, depends on various process parameters. Under optimized conditions, a nearly 30% improvement from the equilibrium conversion levels was achieved as a result of continuous hydrogen removal from the product stream through the CMR assembly that employs a hydrogen permeable silica membrane integrated with the catalyst layer. The system offers a promising alternative to conventional hydrogen permeable membrane reactors that are typically packed with either reforming or WGS catalysts.

Use of terms such as "first" or "second" are strictly for labeling purposes and do not connote order of operations.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

We claim:

1. An autothermal reforming (ATR) and water-gas-shift (WGS) catalytic structure useful for generating hydrogen gas from liquid hydrocarbons, the (ATR) and water-gas-shift (WGS) catalytic structure comprising:
    a bimodal alumina support structure comprising α-alumina and γ-alumina; and
    particles of at least one metal dispersed homogenously throughout the alumina support structure, wherein the particles of the at least one metal are formed by conducting a metal reducing step on the alumina support structure having mixed metal oxide particles, the mixed metal oxide particles formed by thermal decomposition of layered double hydroxides in a sol-gel added to the alumina support structure;
        wherein the ATR and WGS catalytic structure is operable to produce a hydrogen product stream from a liquid hydrocarbon feed stream through a combination of ATR and WGS reactions.

2. The ATR and WGS catalytic structure as claimed in claim 1, wherein the hydrogen product stream is substantially free from carbon monoxide.

3. The ATR and WGS catalytic structure as claim in claim 1, wherein the at least one metal comprises nickel.

4. The ATR and WGS catalytic structure as claimed in claim 1 wherein the at least one metal does not include a noble metal or a precious metal.

5. The ATR and WGS catalytic structure as claimed in claim 1, wherein the at least one metal is selected from the group consisting of rhodium, platinum, nickel, ruthenium, palladium, rhenium, iridium, and combinations thereof.

6. The ATR and WGS catalytic structure as claimed in claim 1, wherein the alumina support structure comprises an internal wall of a tubular support.

7. The ATR and WGS catalytic structure as claimed in claim 6, wherein the tubular support comprises an α-alumina tube.

8. The ATR and WGS catalytic structure as claimed in claim 1, wherein the ATR and WGS catalytic structure is a single layer comprising the bimodal alumina support structure and the particles of at least one metal.

* * * * *